US011375201B2

(12) United States Patent
Liu et al.

(10) Patent No.: US 11,375,201 B2
(45) Date of Patent: Jun. 28, 2022

(54) MODE DEPENDENT MOTION VECTOR DIFFERENCE PRECISION SET

(71) Applicants: Beijing Bytedance Network Technology Co., Ltd., Beijing (CN); Bytedance Inc., Los Angeles, CA (US)

(72) Inventors: Hongbin Liu, Beijing (CN); Li Zhang, San Diego, CA (US); Kai Zhang, San Diego, CA (US); Yue Wang, Beijing (CN)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 16/940,959

(22) Filed: Jul. 28, 2020

(65) Prior Publication Data
US 2020/0359029 A1    Nov. 12, 2020

Related U.S. Application Data

(63) Continuation of application No. PCT/IB2019/055135, filed on Jun. 19, 2019.

(30) Foreign Application Priority Data

Jun. 19, 2018 (WO) ................ PCT/CN2018/091792

(51) Int. Cl.
*H04N 19/139* (2014.01)
*H04N 19/52* (2014.01)
(Continued)

(52) U.S. Cl.
CPC ......... *H04N 19/139* (2014.11); *H04N 19/107* (2014.11); *H04N 19/176* (2014.11);
(Continued)

(58) Field of Classification Search
None
See application file for complete search history.

(56) References Cited

U.S. PATENT DOCUMENTS

| 5,761,343 A | 6/1998 | Haruma et al. |
| 8,891,608 B2 | 11/2014 | Lin et al. |

(Continued)

FOREIGN PATENT DOCUMENTS

| CN | 1550110 A | 11/2004 |
| CN | 102291581 A | 12/2011 |

(Continued)

OTHER PUBLICATIONS

Foreign Priority Document Retrieved from: https://patentscope.wipo.int/search/docs2/pct/WO2019244055/pdf/SuiQF9m5b508_rlad4cEew5R4XvLOy7IKds4qDTS47YZBiKzKMGNDJP_ZLXOvTeSherfEu652sQ-drJYq-W9nPg75DVfG34IB7POSzevW29MWkSaoFUd_utuvTUUdV9N?docId=id00000051833919 (Year: 2018).*

(Continued)

Primary Examiner — Tyler W. Sullivan
(74) Attorney, Agent, or Firm — Perkins Coie LLP

(57) ABSTRACT

A method of processing a video bitstream includes determining a motion precision set based on coding information of a current block. A conversion between a video block and a coded representation of the video block is performed based on the motion precision set. The conversion corresponds to a reconstruction of the current block. In some example aspects, a motion vector difference (MVD) precision of a current block from a motion precision set is determined based on a selected motion precision set and a MVD precision index. A conversion between a video block and a coded representation of the video block using an MVD is performed based on the MVD precision. The MVD represents a difference between a predicted motion vector and an
(Continued)

actual motion vector used during motion compensation processing.

20 Claims, 24 Drawing Sheets

(51) Int. Cl.
    *H04N 19/513*     (2014.01)
    *H04N 19/523*     (2014.01)
    *H04N 19/107*     (2014.01)
    *H04N 19/176*     (2014.01)

(52) U.S. Cl.
    CPC ........... *H04N 19/52* (2014.11); *H04N 19/521* (2014.11); *H04N 19/523* (2014.11)

(56) References Cited

U.S. PATENT DOCUMENTS

| | | | |
|---|---|---|---|
| 9,930,358 B2 | 3/2018 | Kim et al. | |
| 10,306,240 B2 | 5/2019 | Xiu et al. | |
| 10,448,010 B2 | 10/2019 | Chen et al. | |
| 10,455,231 B2 | 10/2019 | Xu et al. | |
| 10,523,964 B2 | 12/2019 | Chuang et al. | |
| 10,560,712 B2 | 2/2020 | Zou et al. | |
| 10,609,384 B2 | 3/2020 | Chen et al. | |
| 10,757,417 B2 | 8/2020 | Zhang et al. | |
| 10,778,999 B2 | 9/2020 | Li et al. | |
| 10,841,609 B1 | 11/2020 | Liu et al. | |
| 10,880,547 B2 | 12/2020 | Xu et al. | |
| 11,109,055 B2 * | 8/2021 | Liu | H04N 19/577 |
| 2007/0025442 A1 | 2/2007 | Okada et al. | |
| 2009/0092189 A1 | 4/2009 | Tsuchiya et al. | |
| 2009/0168868 A1 | 7/2009 | Jahanghir | |
| 2011/0176611 A1 | 7/2011 | Huang et al. | |
| 2012/0300839 A1 | 11/2012 | Sze et al. | |
| 2013/0177084 A1 | 7/2013 | Wang et al. | |
| 2013/0287116 A1 | 10/2013 | Helle et al. | |
| 2015/0124882 A1 | 5/2015 | Yu et al. | |
| 2015/0195562 A1 | 7/2015 | Li et al. | |
| 2015/0373358 A1 | 12/2015 | Pang et al. | |
| 2016/0100189 A1 | 4/2016 | Pang et al. | |
| 2016/0323600 A1 | 11/2016 | Ma | |
| 2016/0337649 A1 | 11/2016 | Chuang et al. | |
| 2016/0353110 A1 | 12/2016 | Zhang et al. | |
| 2017/0332095 A1 | 11/2017 | Zou et al. | |
| 2017/0347116 A1 | 11/2017 | Lin et al. | |
| 2018/0070102 A1 | 3/2018 | Zhang et al. | |
| 2018/0091816 A1 | 3/2018 | Chien et al. | |
| 2018/0098063 A1 | 4/2018 | Chen et al. | |
| 2018/0098089 A1 | 4/2018 | Chen et al. | |
| 2018/0160134 A1 | 6/2018 | Zhang et al. | |
| 2018/0192053 A1 | 7/2018 | Zhou | |
| 2018/0324464 A1 | 7/2018 | Zhang et al. | |
| 2018/0359483 A1 | 12/2018 | Chen et al. | |
| 2018/0359485 A1 | 12/2018 | Liu et al. | |
| 2019/0045193 A1 * | 2/2019 | Socek | H04N 19/23 |
| 2019/0045214 A1 | 2/2019 | Ikai et al. | |
| 2019/0075293 A1 | 3/2019 | Lim et al. | |
| 2019/0082191 A1 | 3/2019 | Chuang et al. | |
| 2019/0089960 A1 | 3/2019 | Chen et al. | |
| 2019/0110076 A1 | 4/2019 | Lim et al. | |
| 2019/0191167 A1 | 6/2019 | Drugeon et al. | |
| 2019/0215534 A1 * | 7/2019 | Kondo | H04N 19/119 |
| 2019/0222865 A1 | 7/2019 | Zhang et al. | |
| 2019/0238864 A1 | 8/2019 | Xiu et al. | |
| 2019/0246143 A1 * | 8/2019 | Zhang | H04N 19/132 |
| 2019/0349588 A1 | 11/2019 | Chen et al. | |
| 2019/0373280 A1 * | 12/2019 | Abe | H04N 19/46 |
| 2019/0387247 A1 * | 12/2019 | Huang | H04N 19/107 |
| 2019/0387250 A1 | 12/2019 | Boyce et al. | |
| 2020/0021837 A1 | 1/2020 | Ikai et al. | |
| 2020/0029091 A1 * | 1/2020 | Chien | H04N 19/103 |
| 2020/0045310 A1 | 2/2020 | Chen et al. | |
| 2020/0137398 A1 | 4/2020 | Zhao et al. | |
| 2020/0145688 A1 | 5/2020 | Zou et al. | |
| 2020/0177877 A1 | 6/2020 | Chen et al. | |
| 2020/0186802 A1 | 6/2020 | Chuang et al. | |
| 2020/0213594 A1 | 7/2020 | Liu et al. | |
| 2020/0213612 A1 | 7/2020 | Liu et al. | |
| 2020/0221117 A1 * | 7/2020 | Liu | H04N 19/52 |
| 2020/0259045 A1 | 8/2020 | Kim et al. | |
| 2020/0275094 A1 | 8/2020 | Lee et al. | |
| 2020/0288141 A1 | 9/2020 | Chono | |
| 2020/0382771 A1 | 12/2020 | Liu et al. | |
| 2020/0382795 A1 | 12/2020 | Zhang et al. | |
| 2020/0396453 A1 | 12/2020 | Zhang et al. | |
| 2020/0396465 A1 | 12/2020 | Zhang et al. | |
| 2020/0396477 A1 * | 12/2020 | Furht | H04N 19/54 |
| 2020/0404255 A1 | 12/2020 | Zhang et al. | |
| 2020/0404260 A1 | 12/2020 | Zhang et al. | |
| 2020/0413040 A1 * | 12/2020 | Lim | H04N 19/119 |
| 2020/0413048 A1 | 12/2020 | Zhang et al. | |
| 2021/0127112 A1 | 4/2021 | Choi et al. | |
| 2021/0136390 A1 | 5/2021 | Chuang et al. | |
| 2021/0211707 A1 | 7/2021 | Liu et al. | |

FOREIGN PATENT DOCUMENTS

| | | |
|---|---|---|
| CN | 1027831479 A | 11/2012 |
| CN | 103621099 A | 3/2014 |
| CN | 104303506 A | 1/2015 |
| CN | 104335586 A | 2/2015 |
| CN | 104521237 A | 4/2015 |
| CN | 104620576 A | 5/2015 |
| CN | 104662906 A | 5/2015 |
| CN | 104768016 A | 7/2015 |
| CN | 105556964 A | 5/2016 |
| CN | 106165419 A | 11/2016 |
| CN | 106303543 A | 11/2016 |
| CN | 103733625 B | 4/2017 |
| CN | 106797229 A | 5/2017 |
| CN | 106797476 A | 5/2017 |
| CN | 107113442 A | 8/2017 |
| CN | 107257480 A | 10/2017 |
| CN | 107979756 A | 5/2018 |
| CN | 108235007 A | 6/2018 |
| CN | 108781284 A | 11/2018 |
| CN | 107710761 A | 12/2018 |
| EP | 1469682 A1 | 10/2004 |
| EP | 3203743 A1 | 8/2017 |
| EP | 3291557 A1 | 3/2018 |
| GB | 2539212 A | 12/2016 |
| JP | 2012060208 A | 3/2012 |
| JP | 2018524918 A | 8/2018 |
| WO | 2007003340 A2 | 1/2007 |
| WO | 2017052000 A1 | 3/2017 |
| WO | 2017082443 A1 | 5/2017 |
| WO | 2017156705 A1 | 9/2017 |
| WO | 2018002021 A1 | 1/2018 |
| WO | 2018064524 A1 | 4/2018 |
| WO | 2018067672 A1 | 4/2018 |
| WO | 2018117546 A1 | 6/2018 |
| WO | 2018175720 A1 | 9/2018 |
| WO | 2019235896 A1 | 12/2019 |
| WO | 2020047132 A1 | 3/2020 |

OTHER PUBLICATIONS

Alshin A et al. "Description of SDR, HDR and 360 degree video coding technology proposal by considering mobile application sceniario by Samsung, Huawei, GoPro, and HiSilicon," 10, JVET Meeting; Apr. 10-20, 2018; San Diego, the Joint Video Exploration Team of ISO/IEC JTC1/SC29/WG11 and ITU-T SG.16; URL: http://phenix.int-evry.fr/jvet/ . . . , No. JVET-J0024-v2; Apr. 14, 2018.

Chen et al. Algorithm Description of Joint Exploration Test Model 7 (JEM 7), Joint Video Exploration Team (JVET) of ITU-T SG 16 WP3 and ISO/IEC HTC 1/SC 29/WG 11, 7th Meeting, Torino, IT, Jul. 13-21, 2017, Document JVET-G1001-v1.

Guo et al. "Adaptive Motion Vector Resolution with Implicit Signaling," 2010 17th IEEE International Conference on Image

(56) References Cited

OTHER PUBLICATIONS

Processing (ICIP 2010); Sep. 26-29, 2010; Hong Kong, China, Sep. 1, 2010, pp. 2057-2060, XP055564982, Piscataway, JN, USA.

Rosewarne C et al. "High Efficiency Video Coding (HEVC) Test Model 16 (HM16) Encoder Description Update 9", 28, JCT-VC Meeting; Jul. 15-21, 2017; Torino, Joint Collaborative Team on Video Coding of ISO-IEC JTC1/SC29/WG11 and ITU-T SG.16, JCTVC-AB1002, Jul. 21, 2017, Retrieved from the internet: URL:http://wftp3.itu.int/av-arch/jctvc-site/.

Rosewarne C et al. "High Efficiency Video Coding (HEVC) Test Model 16 (HM16) Improved Encoder Description Update 7", 25th meeting, JCT-VC Meeting; Oct. 14-21, 2016; Chengdu, CN, Joint Collaborative Team on Video Coding of ITU-T SG 16 WP3 and ISO/IEC JTC1/SC29/WG11, document JCTVC-Y1002.

Wang et al. "Adaptive Motion Vector Resolution Prediction in Block-based Video Coding," 2015 Visual Communications and Image Processing (VCIP), IEEE, Dec. 13, 2015, pp. 1-4, XP032894127.

Xu et al. "Intra Block Copy in HEVC Screen Content Coding Extensions," IEEE Journal on Emerging and Selected Topics in Circuits and Systems, IEEE, Piscataway, NJ, USA, 6(4):409-419; Dec. 1, 2016.

"High Efficiency Video Coding," Series H: Audiovisual Media Systems: Infrastructure of Audiovisual Services—Coding of moving video, ITU-Tand ISO/IEC, ITU-T H.265, ISO/IEC 23008-2, Feb. 2018.

JEM-7.0:—https://jvet.hhi.fraunhofer.de/svn/svn_HMJEMSoftware/tags/ HM-16.6-38JEM-7.0 (Accessed on Apr. 21, 2020).

International Search Report and Written Opinion from PCT/IB2019/055131 dated Nov. 25, 2019, (18 pages).

International Search Report and Written Opinion from PCT/IB2019/055132 dated Nov. 25, 2019, (19 pages).

International Search Report and Written Opinion from PCT/IB2019/055134 dated Nov. 20, 2019, (18 pages).

International Search Report and Written Opinion from PCT/IB2019/055135 dated Nov. 20, 2019, (18 pages).

International Search Report and Written Opinion from PCT/IB2019/055141 dated Nov. 25, 2019, (19 pages).

Akula et al. ""Description of SDR, HDR and 360° video coding technology proposal considering mobile application scenario by Samsung, Huawei, GoPro, and HiSilicon"" (JVET)of ITU-T SG 16 WP 3 and ISO/IEC JTC 1/SC 29/WG 1110th Meeting: San Diego, US, (JVET-J0024), (Apr. 2018).

An et al. "Progressive MV Resolution" (JCT-VC) of ITU-T SG16 WP3 and ISO/IEC JTC1/SC29/WG11, 6th Meeting Torino, IT, (JCTVC-F125), (Jul. 2011).

Bross et al. "Versatile Video Coding (Draft 3)," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L1001, 2018.

Chen et al. "CE4: Symmetrical Mode for Bi-Prediction (Test 3.2)" Joint Video Experts Team (JVET) of ITU-T SG 16 WP 3 and ISO/IEC JTC 1/SC 29/WG 11, 11th Meeting: Ljubljana, SI, Jul. 10-18, 2018, Document JVET-K0188, Jul. 18, 2018.

"Chen, et al. ""CE4: Symmetrical MVD mode (Test 4.4.3)""" (JVET)of ITU-T SG 16 WP 3 and ISO/IEC JTC 1/SC 29/NG 1113th Meeting: Marrakech, MA, (JVET-M0481), (Jan. 2019).".

Han et al. "CE4.1.3: Affine Motion Compensation Prediction" (JVET) of ITU-T SG 16 WP 3 and ISO/IEC JTC 1/SC 29/WG 11, 11th Meeting: Ljubljana, SI, (JVET-K0337), (Jul. 2018).

He et al. "CE4-related: Adaptive precision for affine MVD coding" (JVET) of ITU-T SG 16 WP 3 and ISO/IEC JTC 1/SC 29/WG 11, 12th Meeting: Macao, CN, (JVET-L0259), (Oct. 2018).

Huang et al. "Control-Point Representation and Differential Coding Affine-Motion Compensation," IEEE Transactions an Circuits and Systems for Video Technology, Oct. 2013, 23(10):1651-1660.

Lai et al. "CE4.3.4: Removal of AMVR flag constraint" (JVET) of ITU-T SG 16 WP 3 and ISO/IEC JTC 1/SC 29/WG 11, 11th Meeting: Ljubljana, SI, (JVET-K0247), (Jul. 2018).

Li et al. "An Efficient Four-Parameter Affine Motion Model For Video Coding" IEEE Transactions On Circuits And Systems For Video Technology, (2018), vol. 28, No. 8, pp. 1934-1948.

Liu et al. "CE4-related: Adaptive Motion Vector Resolution for Affine InterMode" (JVET) of ITU-T SG 16 WP 3 and SO/IEC JTC 1/SC 29/WG 11,12th Meeting: Macao, CN, (JVET-L0332), (Oct. 2018). (is there a version 2 from SR).

Liu et al. "CE2: Adaptive Motion Vector Resolution for Affine Inter Mode (Test 2.1.2)," Joint Video Experts Team (JVET) of ITU-T SG 16 WP 3 and ISO/IEC JTC 1/SC 29/WG 11, 13th Meeting: Marrakech, MA, Jan. 9-18, 2019, Document No. JVET-M0246.

"Luo et al. ""CE2-related: Symmetric MVD for Affine Bi-prediction Coding"" Joint Video Experts Team (JVET)of ITU-T SG 16 WP 3 and ISO/IEC JTC 1/SC 29/WG 11, 13th Meeting: Marrakech, MA, Jan. 9-18, 2019, document JVET-M0467, Jan. 2019.".

Luo et al. "CE4-related: Simplified Symmetric MVD based on CE4.4.3," Joint Video Experts Team (JVET) of ITU-T SG 16 WP 3 and ISO/IEC JTC 1/SC 29/WG 11, 13th Meeting; Marrakech, MA, Jan. 9-18, 2019, Document JVET-M0444, Jan. 18, 2019.

Zhang et al. "Adaptive Motion Vector Resolution Rounding Align," Joint Video Experts Team (JVET) of ITU-T SG 16 WP 3 and ISO/IEC JTC 1/SC 29/WG 11, 12th Meeting: Macao, Oct. 2018, Document No. JVET-L0377.

Zhu et al. "Simplified HMVP" Joint Video Experts Team (JVET) of ITU-T SG 16 WP 3 and ISO/IEC JTC 1/SC 29/WG 11,13th Meeting: Marrakech, MA, Jan. 9-18, 2019, document JVET-M0473, Jan. 2019.

Specification of U.S. Appl. No. 62/724,500 supporting WO2020/047132 (2018).

International Search Report and Written Opinion from PCT/IB2019/057892 dated Feb. 25, 2020 (21 pages).

International Search Report and Written Opinion from PCT/IB2019/057895 dated Jan. 2, 2020 (18 pages).

International Search Report and Written Opinion from PCT/IB2019/057897 dated Jan. 2, 2020 (21 pages).

International Search Report and Written Opinion from PCT/CN2020/074122 dated Apr. 1, 2020(10 pages).

International Search Report and Written Opinion from PCT/CN2020/074123 dated Apr. 30, 2020(9 pages).

International Search Report and Written Opinion from PCT/CN2020/074135 dated Apr. 22, 2020(10 pages).

International Search Report and Written Opinion from International Patent Application No. PCT/CN2020/081575 dated Jun. 22, 2020(10 pages).

International Search Report and Written Opinion from PCT/CN2020/081580 dated Jun. 22, 2020(11 pages).

Non-Final Office Action from U.S. Appl. No. 16/814,840 dated Sep. 29, 2020.

Notice of Allowance from U.S. Appl. No. 16/814,832 dated Oct. 28, 2020.

Final Office Action from U.S. Appl. No. 16/814,840 dated Jan. 21, 2021.

Non-Final Office Action from U.S. Appl. No. 16/814,832 dated Apr. 15, 2021.

Non-Final Office Action from U.S. Appl. No. 17/229,064 dated Jun. 15, 2021.

Final Office Action from U.S. Appl. No. 17/229,064 dated Oct. 29, 2021.

Non-Final Office Action from U.S. Appl. No. 17/204,448 dated Mar. 1, 2022.

Notice of Allowance from U.S. Appl. No. 17/229,064 dated Mar. 16, 2022.

Li et al. "Adaptive Motion Vector Resolution for Screen Content," Joint Collaborative Team on Video Coding (JCT-VC) of ITU-T SG 16 WP 3 and ISO/IEC JTC 1/SC 29/WG 11, 19th Meeting, Strasbourg, FR, Oct. 17-24, 2014, document JCTVC-S0085, 2014. (cited in CN201910888243.6 OA dated May 11, 2022).

\* cited by examiner ional Patent Application No. PCT/CN2018/091792, filed on Jun. 19, 2018. For all purposes under the law, the entire disclosures of the aforementioned applications are incorporated by reference as part of the disclosure of this application.

TECHNICAL FIELD

This document is related to video coding and decoding technologies.

BACKGROUND

Digital video accounts for the largest bandwidth use on the internet and other digital communication networks. As the number of connected user devices capable of receiving and displaying video increases, it is expected that the bandwidth demand for digital video usage will continue to grow.

SUMMARY

The disclosed techniques may be used by video decoder or encoder embodiments for allowing a flexible signaling and use of motion vector precision for bi-predictive encoding in which up to two lists of reference frames are used by motion vectors. In one example aspect, different precisions may be allowed for different reference lists. The precision used for each reference frame may be content dependent or defined by an a priori set of rules.

In one example aspect, a method of processing a video bitstream includes determining a motion precision set based on coding information of a current block. A conversion between a video block and a coded representation of the video block is performed based on the motion precision set. The conversion corresponds to a reconstruction of the current block.

In another example aspect, a MVD precision of a current block from a motion precision set is determined based on a selected motion precision set and a signaled motion vector difference (MVD) precision index. A conversion between a video block and a coded representation of the video block using a MVD is performed based on the MVD precision. The MVD represents a difference between a predicted motion vector and an actual motion vector used during motion compensation processing.

In another example aspect, the above-described method may be implemented by a video decoder apparatus that comprises a processor.

In another example aspect, the above-described method may be implemented by a video encoder apparatus comprising a processor for decoding encoded video during video encoding process.

In yet another example aspect, these methods may be embodied in the form of processor-executable instructions and stored on a computer-readable program medium.

These, and other, aspects are further described in the present document.

BRIEF DESCRIPTION OF THE DRAWINGS

FIG. 22A access positions outside of the block;
FIG. 22B padding issued in order to avoid extra memory access and calculation.

DETAILED DESCRIPTION

Figure 1:
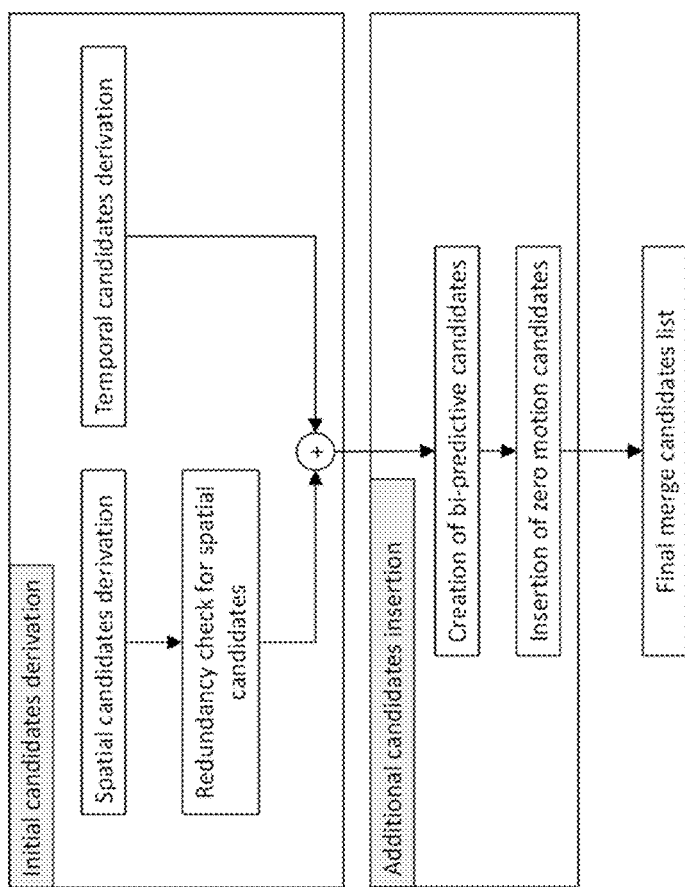
FIG. 1 shows an example of a derivation process for merge candidates list construction.

The present document provides various techniques that can be used by a decoder of video bitstreams to improve the quality of decompressed or decoded digital video. Furthermore, a video encoder may also implement these techniques during the process of encoding in order to reconstruct decoded frames used for further encoding.

Section headings are used in the present document for ease of understanding and do not limit the embodiments and techniques to the corresponding sections. As such, embodiments from one section can be combined with embodiments from other sections.

Furthermore, while certain embodiments are described with reference to Versatile Video Coding or other specific video codecs, the disclosed techniques are applicable to other video coding technologies also. Furthermore, while some embodiments describe video coding steps in detail, it will be understood that corresponding steps decoding that undo the coding will be implemented by a decoder. Furthermore, the term video processing encompasses video coding or compression, video decoding or decompression and video transcoding in which video pixels are represented from one compressed format into another compressed format or at a different compressed bitrate.

2. TECHNICAL FRAMEWORK

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, Joint Video Exploration Team (JVET) was founded by VCEG and MPEG jointly in 2015. Since then, many new methods have been adopted by JVET and put into the reference software named Joint Exploration Model (JEM). In April 2018, the Joint Video Expert Team (JVET) between VCEG (Q6/16) and ISO/IEC JTC1 SC29/WG11 (MPEG) was created to work on the VVC standard targeting at 50% bitrate reduction compared to HEVC.

2.1 Inter Prediction in HEVC/H.265

Each inter-predicted PU has motion parameters for one or two reference picture lists. Motion parameters include a motion vector and a reference picture index. Usage of one of the two reference picture lists may also be signaled using inter_pred_idc. Motion vectors may be explicitly coded as deltas relative to predictors.

When a CU is coded with skip mode, one PU is associated with the CU, and there are no significant residual coefficients, no coded motion vector delta or reference picture index. A merge mode is specified whereby the motion parameters for the current PU are obtained from neighboring PUs, including spatial and temporal candidates. The merge mode can be applied to any inter-predicted PU, not only for skip mode. The alternative to merge mode is the explicit transmission of motion parameters, where motion vector (to be more precise, motion vector difference compared to a motion vector predictor), corresponding reference picture index for each reference picture list and reference picture list usage are signaled explicitly per each PU. Such a mode is named Advanced motion vector prediction (AMVP) in this document.

When signaling indicates that one of the two reference picture lists is to be used, the PU is produced from one block of samples. This is referred to as 'uni-prediction'. Uni-prediction is available both for P-slices and B-slices.

When signaling indicates that both of the reference picture lists are to be used, the PU is produced from two blocks of samples. This is referred to as 'bi-prediction'. Bi-prediction is available for B-slices only.

The following text provides the details on the inter prediction modes specified in HEVC. The description will start with the merge mode.

2.1.1 Merge Mode 2.1.1.1 Derivation of Candidates for Merge Mode

When a PU is predicted using merge mode, an index pointing to an entry in the merge candidates list is parsed from the bitstream and used to retrieve the motion information. The construction of this list is specified in the HEVC standard and can be summarized according to the following sequence of steps:

Step 1: Initial candidates derivation
Step 1.1: Spatial candidates derivation
Step 1.2: Redundancy check for spatial candidates
Step 1.3: Temporal candidates derivation
Step 2: Additional candidates insertion
Step 2.1: Creation of bi-predictive candidates
Step 2.2: Insertion of zero motion candidates These steps are also schematically depicted in FIG. 1. For spatial merge candidate derivation, a maximum of four merge candidates are selected among candidates that are located in five different positions. For temporal merge candidate derivation, a maximum of one merge candidate is selected among two candidates. Since constant number of candidates for each PU is assumed at decoder, additional candidates are generated when the number of candidates obtained from step 1 does not reach the maximum number of merge candidate (MaxNumMergeCand) which is signalled in slice header. Since the number of candidates is constant, index of best merge candidate is encoded using truncated unary binarization (TU). If the size of CU is equal to 8, all the PUs of the current CU share a single merge candidate list, which is identical to the merge candidate list of the 2N×2N prediction unit.

In the following, the operations associated with the aforementioned steps are detailed.

2.1.1.2 Spatial Candidate Derivation

Figure 3:
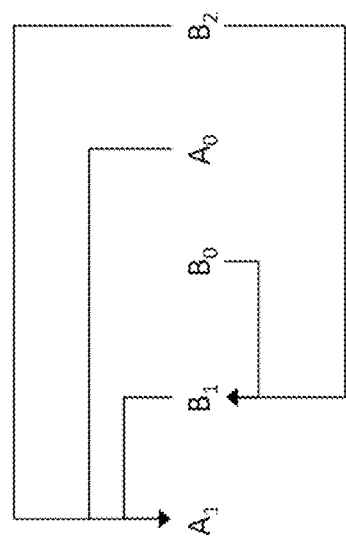
FIG. 3 shows examples of candidate pairs considered for redundancy check of spatial merge candidates.
Figure 2:
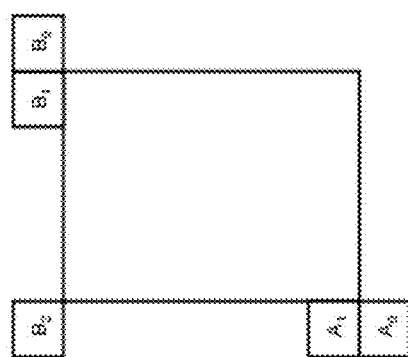
FIG. 2 shows example positions of spatial merge candidates.
Figures 4A, 4B:
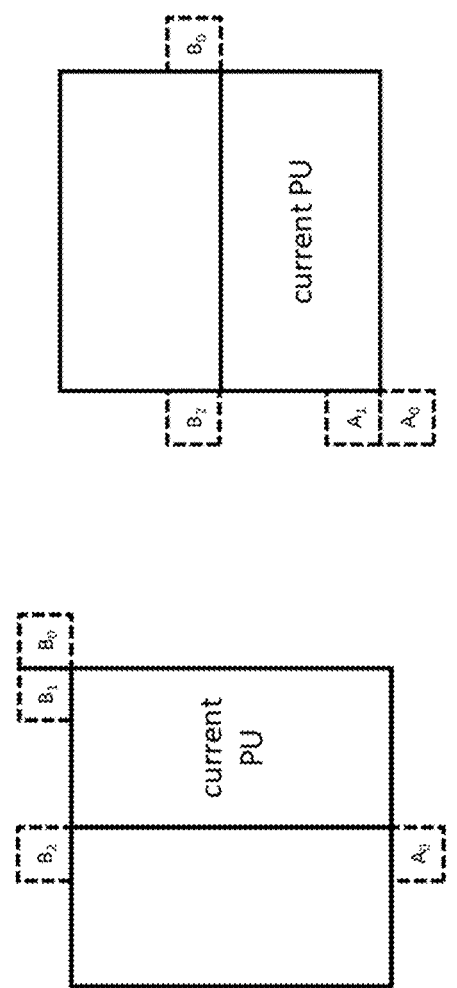
FIG. 4A-4B show example positions for the second PU of N×2N and 2N×N partitions.

In the derivation of spatial merge candidates, a maximum of four merge candidates are selected among candidates located in the positions depicted in FIG. 2. The order of derivation is $A_1$, $B_1$, $B_0$, $A_0$ and $B_2$. Position $B_2$ is considered only when any PU of position $A_1$, $B_1$, $B_0$, $A_0$ is not available (e.g. because it belongs to another slice or tile) or is intra coded. After candidate at position $A_1$ is added, the addition of the remaining candidates is subject to a redundancy check which ensures that candidates with same motion information are excluded from the list so that coding efficiency is improved. To reduce computational complexity, not all possible candidate pairs are considered in the mentioned redundancy check. Instead only the pairs linked with an arrow in FIG. 3 are considered and a candidate is only added to the list if the corresponding candidate used for redundancy check has not the same motion information. Another source of duplicate motion information is the "second PU" associated with partitions different from 2N×2N. As an example, FIG. 4A and FIG. 4B depict the second PU for the case of N×2N and 2N×N, respectively. When the current PU is partitioned as N×2N, candidate at position $A_1$ is not considered for list construction. In fact, by adding this candidate will lead to two prediction units having the same motion information, which is redundant to just have one PU in a coding unit. Similarly, position $B_1$ is not considered when the current PU is partitioned as 2N×N.

2.1.1.3 Temporal Candidate Derivation

Figure 5:
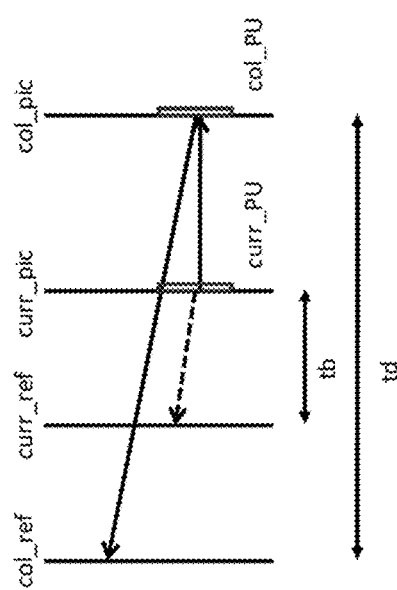
FIG. 5 is an example illustration of motion vector scaling for temporal merge candidate.

In this step, only one candidate is added to the list. Particularly, in the derivation of this temporal merge candidate, a scaled motion vector is derived based on co-located PU belonging to the picture which has the smallest POC difference with current picture within the given reference picture list. The reference picture list to be used for derivation of the co-located PU is explicitly signalled in the slice header. The scaled motion vector for temporal merge candidate is obtained as illustrated by the dotted line in FIG. 5, which is scaled from the motion vector of the co-located PU using the POC distances, tb and td, where tb is defined to be the POC difference between the reference picture of the current picture and the current picture and td is defined to be the POC difference between the reference picture of the co-located picture and the co-located picture. The reference picture index of temporal merge candidate is set equal to zero. A practical realization of the scaling process is described in the HEVC specification. For a B-slice, two motion vectors, one is for reference picture list 0 and the other is for reference picture list 1, are obtained and combined to make the bi-predictive merge candidate.

Figure 6:
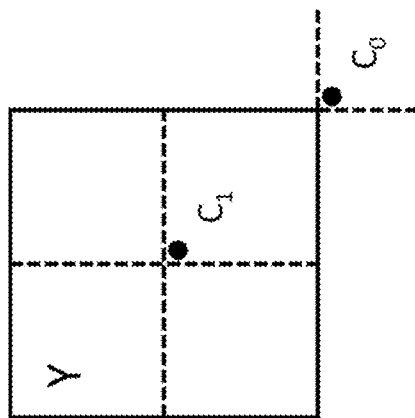
FIG. 6 shows examples of candidate positions for temporal merge candidate C0 and C1.

In the co-located PU (Y) belonging to the reference frame, the position for the temporal candidate is selected between candidates $C_0$ and $C_1$, as depicted in FIG. 6. If PU at position $C_0$ is not available, is intra coded, or is outside of the current CTU row, position $C_1$ is used. Otherwise, position $C_0$ is used in the derivation of the temporal merge candidate.

2.1.1.4 Additional Candidate Insertion

Figure 7:
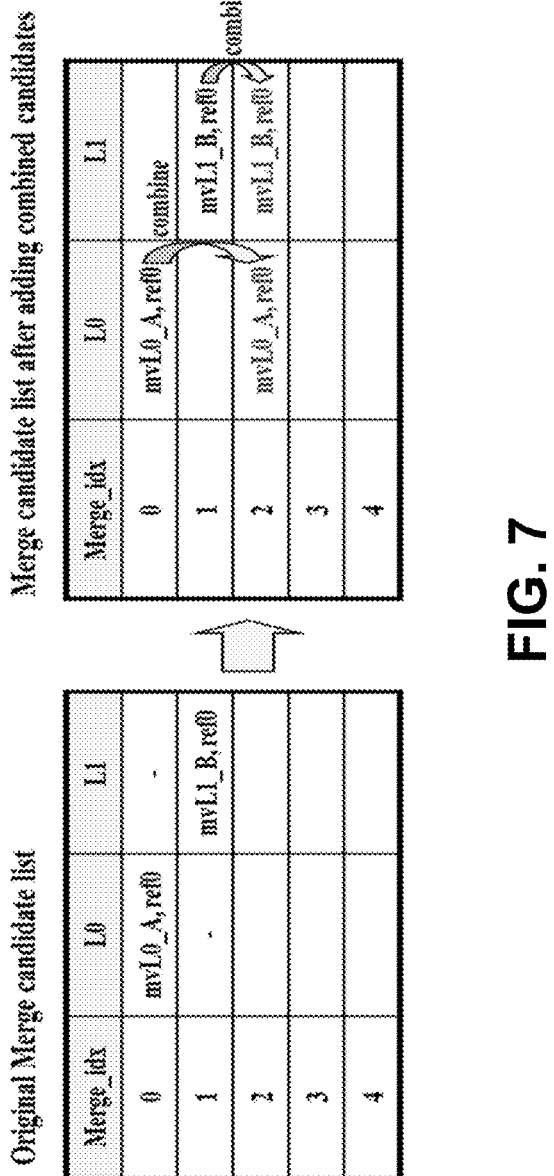
FIG. 7 shows an example of combined bi-predictive merge candidate.

Besides spatial and temporal merge candidates, there are two additional types of merge candidates: combined bi-predictive merge candidate and zero merge candidate. Combined bi-predictive merge candidates are generated by utilizing spatial and temporal merge candidates. Combined bi-predictive merge candidate is used for B-Slice only. The combined bi-predictive candidates are generated by combining the first reference picture list motion parameters of an initial candidate with the second reference picture list motion parameters of another. If these two tuples provide different motion hypotheses, they will form a new bi-predictive candidate. As an example, FIG. 7 depicts the case when two candidates in the original list (on the left), which have mvL0 and refIdxL0 or mvL1 and refIdxL1, are used to create a combined bi-predictive merge candidate added to the final list (on the right). There are numerous rules regarding the combinations which are considered to generate these additional merge candidates.

Zero motion candidates are inserted to fill the remaining entries in the merge candidates list and therefore hit the MaxNumMergeCand capacity. These candidates have zero spatial displacement and a reference picture index which starts from zero and increases every time a new zero motion candidate is added to the list. The number of reference frames used by these candidates is one and two for uni and bi-directional prediction, respectively. Finally, no redundancy check is performed on these candidates.

2.1.1.5 Motion Estimation Regions for Parallel Processing

To speed up the encoding process, motion estimation can be performed in parallel whereby the motion vectors for all prediction units inside a given region are derived simultaneously. The derivation of merge candidates from spatial neighbourhood may interfere with parallel processing as one prediction unit cannot derive the motion parameters from an adjacent PU until its associated motion estimation is completed. To mitigate the trade-off between coding efficiency and processing latency, HEVC defines the motion estimation region (MER) whose size is signalled in the picture parameter set using the "log 2_parallel_merge_level_minus2" syntax element. When a MER is defined, merge candidates falling in the same region are marked as unavailable and therefore not considered in the list construction.

2.1.2 AMVP

AMVP (advanced motion vector prediction) exploits spatio-temporal correlation of motion vector with neighbouring PUs, which is used for explicit transmission of motion parameters. For each reference picture list, a motion vector candidate list is constructed by firstly checking availability of left, above temporally neighbouring PU positions, removing redundant candidates and adding zero vector to make the candidate list to be constant length. Then, the encoder can select the best predictor from the candidate list and transmit the corresponding index indicating the chosen candidate. Similarly with merge index signalling, the index of the best motion vector candidate is encoded using truncated unary. The maximum value to be encoded in this case is 2 (see FIG. 8). In the following sections, details about derivation process of motion vector prediction candidate are provided.

2.1.2.1 Derivation of AMVP Candidates

Figure 8:
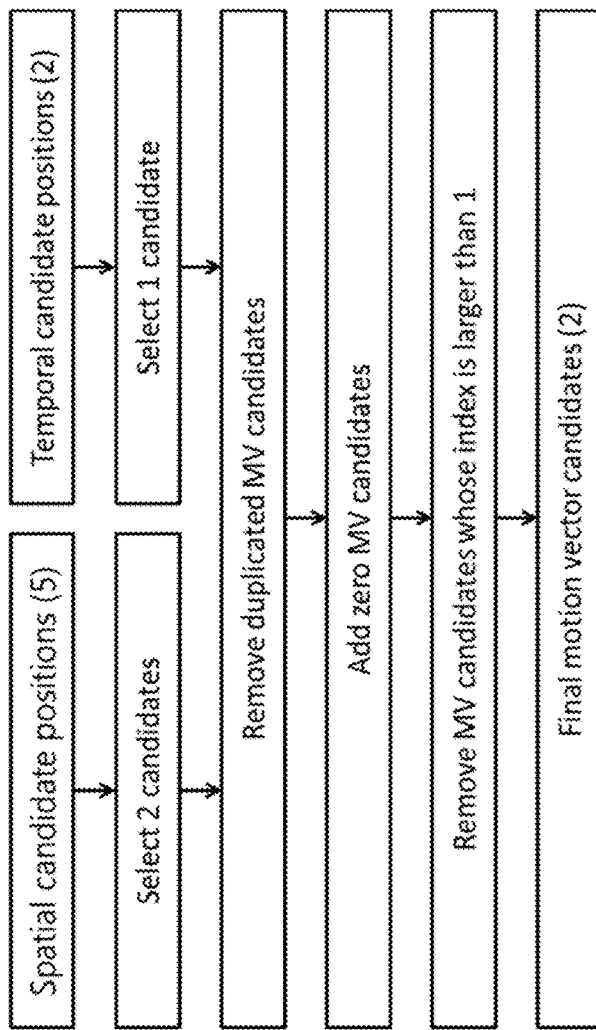
FIG. 8 shows an example derivation process for motion vector prediction candidates.

FIG. 8 summarizes derivation process for motion vector prediction candidate.

In motion vector prediction, two types of motion vector candidates are considered: spatial motion vector candidate and temporal motion vector candidate. For spatial motion vector candidate derivation, two motion vector candidates are eventually derived based on motion vectors of each PU located in five different positions as depicted in FIG. 2.

For temporal motion vector candidate derivation, one motion vector candidate is selected from two candidates, which are derived based on two different co-located positions. After the first list of spatio-temporal candidates is made, duplicated motion vector candidates in the list are removed. If the number of potential candidates is larger than two, motion vector candidates whose reference picture index within the associated reference picture list is larger than 1 are removed from the list. If the number of spatio-temporal motion vector candidates is smaller than two, additional zero motion vector candidates is added to the list.

2.1.2.2 Spatial Motion Vector Candidates

In the derivation of spatial motion vector candidates, a maximum of two candidates are considered among five potential candidates, which are derived from PUs located in positions as depicted in FIG. 2, those positions being the same as those of motion merge. The order of derivation for the left side of the current PU is defined as $A_0$, $A_1$, and scaled $A_0$, scaled $A_1$. The order of derivation for the above side of the current PU is defined as $B_0$, $B_1$, $B_2$, scaled $B_0$, scaled $B_1$, scaled $B_2$. For each side there are therefore four cases that can be used as motion vector candidate, with two cases not required to use spatial scaling, and two cases where spatial scaling is used. The four different cases are summarized as follows.

No spatial scaling
(1) Same reference picture list, and same reference picture index (same POC)
(2) Different reference picture list, but same reference picture (same POC)

Spatial scaling
(3) Same reference picture list, but different reference picture (different POC)
(4) Different reference picture list, and different reference picture (different POC)

The no-spatial-scaling cases are checked first followed by the spatial scaling. Spatial scaling is considered when the POC is different between the reference picture of the neighboring PU and that of the current PU regardless of reference picture list. If all PUs of left candidates are not available or are intra coded, scaling for the above motion vector is allowed to help parallel derivation of left and above MV candidates. Otherwise, spatial scaling is not allowed for the above motion vector.

Figure 9:
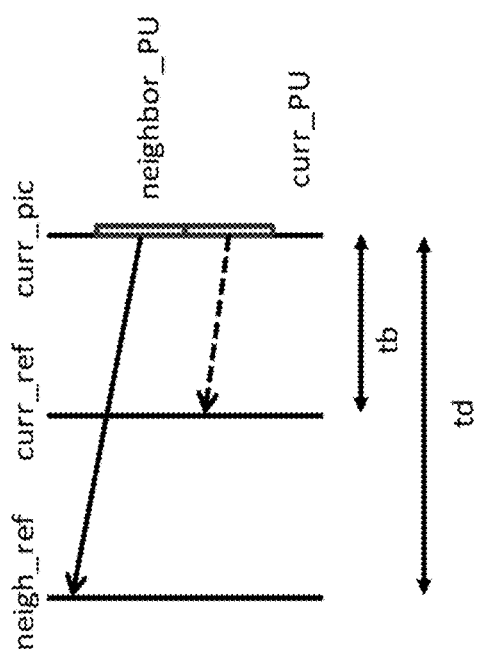
FIG. 9 shows an example illustration of motion vector scaling for spatial motion vector candidate.

In a spatial scaling process, the motion vector of the neighbouring PU is scaled in a similar manner as for temporal scaling, as depicted as FIG. 9. The main difference is that the reference picture list and index of current PU is given as input; the actual scaling process is the same as that of temporal scaling.

2.1.2.3 Temporal Motion Vector Candidates

Apart for the reference picture index derivation, all processes for the derivation of temporal merge candidates are the same as for the derivation of spatial motion vector candidates (see FIG. 6). The reference picture index is signalled to the decoder.

2.2 New Inter Prediction Methods in JEM

2.2.1 Sub-CU Based Motion Vector Prediction

In the JEM with QTBT (Quadtree plus Binary Tree), each CU can have at most one set of motion parameters for each prediction direction. Two sub-CU level motion vector prediction methods are considered in the encoder by splitting a large CU into sub-CUs and deriving motion information for all the sub-CUs of the large CU. Alternative temporal motion vector prediction (ATMVP) method allows each CU to fetch multiple sets of motion information from multiple blocks smaller than the current CU in the collocated reference picture. In spatial-temporal motion vector prediction (STMVP) method motion vectors of the sub-CUs are derived recursively by using the temporal motion vector predictor and spatial neighbouring motion vector.

To preserve more accurate motion field for sub-CU motion prediction, the motion compression for the reference frames is currently disabled.

2.2.1.1 Alternative Temporal Motion Vector Prediction

Figure 10:
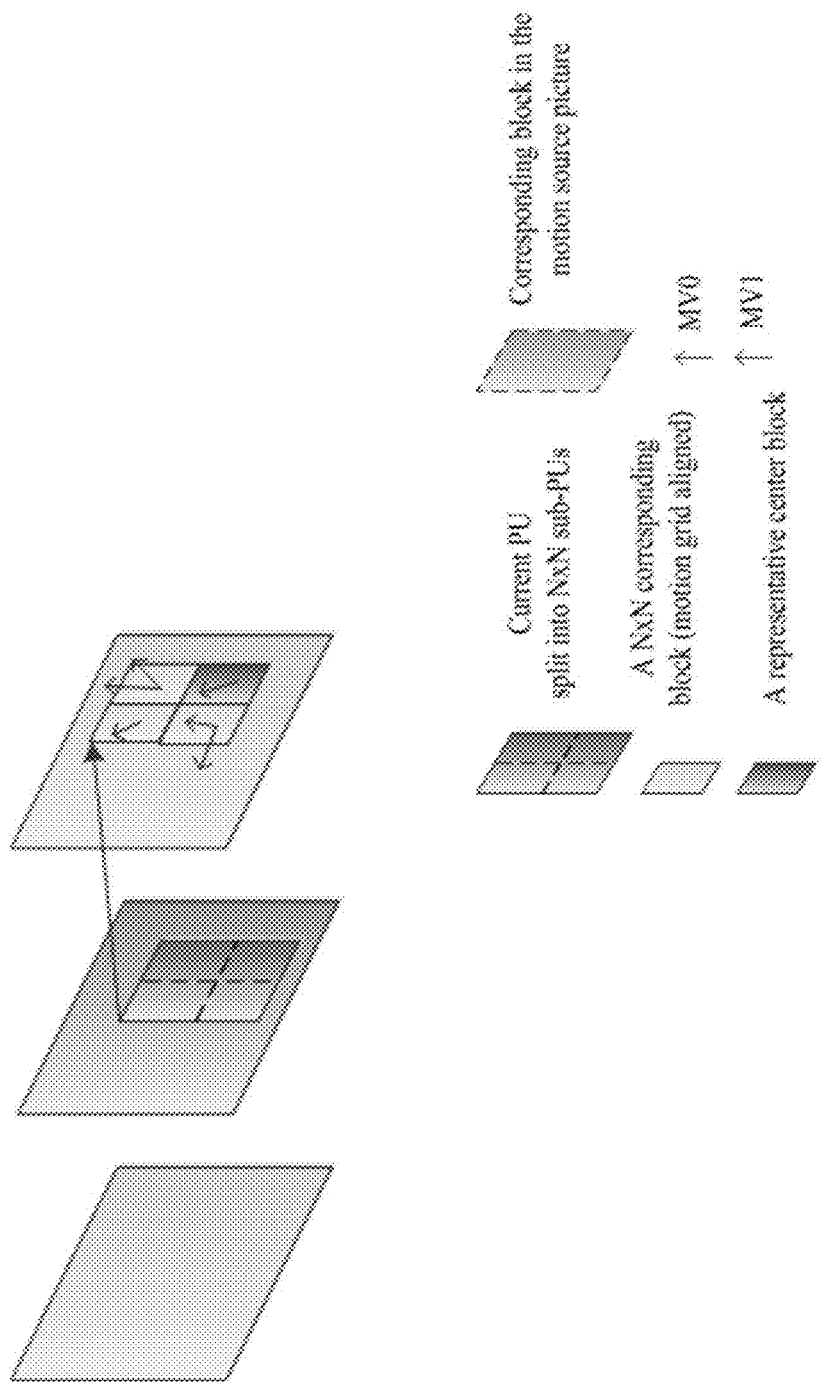
FIG. 10 shows an example of ATMVP motion prediction for a CU.

In the alternative temporal motion vector prediction (ATMVP) method, the motion vectors temporal motion vector prediction (TMVP) is modified by fetching multiple sets of motion information (including motion vectors and reference indices) from blocks smaller than the current CU. As shown in FIG. 10, the sub-CUs are square N×N blocks (N is set to 4 by default).

ATMVP predicts the motion vectors of the sub-CUs within a CU in two steps. The first step is to identify the corresponding block in a reference picture with a so-called temporal vector. The reference picture is called the motion source picture. The second step is to split the current CU into sub-CUs and obtain the motion vectors as well as the reference indices of each sub-CU from the block corresponding to each sub-CU, as shown in FIG. 10.

In the first step, a reference picture and the corresponding block is determined by the motion information of the spatial neighbouring blocks of the current CU. To avoid the repetitive scanning process of neighbouring blocks, the first merge candidate in the merge candidate list of the current CU is used. The first available motion vector as well as its associated reference index are set to be the temporal vector and the index to the motion source picture. This way, in ATMVP, the corresponding block may be more accurately identified, compared with TMVP, wherein the corresponding block (sometimes called collocated block) is always in a bottom-right or center position relative to the current CU.

In the second step, a corresponding block of the sub-CU is identified by the temporal vector in the motion source picture, by adding to the coordinate of the current CU the temporal vector. For each sub-CU, the motion information of its corresponding block (the smallest motion grid that covers the center sample) is used to derive the motion information for the sub-CU. After the motion information of a corresponding N×N block is identified, it is converted to the motion vectors and reference indices of the current sub-CU, in the same way as TMVP of HEVC, wherein motion scaling and other procedures apply. For example, the decoder checks whether the low-delay condition (i.e. the POCs of all reference pictures of the current picture are smaller than the POC of the current picture) is fulfilled and possibly uses motion vector $MV_x$ (the motion vector corresponding to reference picture list X) to predict motion vector $MV_y$ (with X being equal to 0 or 1 and Y being equal to 1−X) for each sub-CU.

2.2.1.2 Spatial-Temporal Motion Vector Prediction

Figure 11:
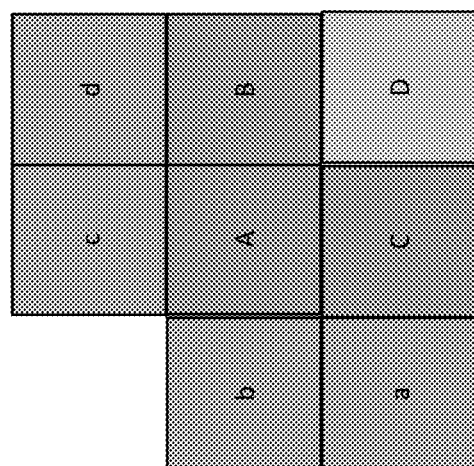
FIG. 11 shows an example of one CU with four sub-blocks (A-D) and its neighboring blocks (a-d).

In this method, the motion vectors of the sub-CUs are derived recursively, following raster scan order. FIG. 11 illustrates this concept. Let us consider an 8×8 CU which contains four 4×4 sub-CUs A, B, C, and D. The neighbouring 4×4 blocks in the current frame are labelled as a, b, c, and d.

The motion derivation for sub-CU A starts by identifying its two spatial neighbours. The first neighbour is the N×N block above sub-CU A (block c). If this block c is not available or is intra coded the other N×N blocks above sub-CU A are checked (from left to right, starting at block c). The second neighbour is a block to the left of the sub-CU A (block b). If block b is not available or is intra coded other blocks to the left of sub-CU A are checked (from top to bottom, staring at block b). The motion information obtained from the neighbouring blocks for each list is scaled to the first reference frame for a given list. Next, temporal motion vector predictor (TMVP) of sub-block A is derived by following the same procedure of TMVP derivation as specified in HEVC. The motion information of the collocated block at location D is fetched and scaled accordingly. Finally, after retrieving and scaling the motion information, all available motion vectors (up to 3) are averaged separately for each reference list. The averaged motion vector is assigned as the motion vector of the current sub-CU.

2.2.1.3 Sub-CU Motion Prediction Mode Signalling

The sub-CU modes are enabled as additional merge candidates and there is no additional syntax element required to signal the modes. Two additional merge candidates are added to merge candidates list of each CU to represent the ATMVP mode and STMVP mode. Up to seven merge candidates are used, if the sequence parameter set indicates that ATMVP and STMVP are enabled. The encoding logic of the additional merge candidates is the same as for the merge candidates in the HM, which means, for each CU in P or B slice, two more RD checks is needed for the two additional merge candidates.

In the JEM, all bins of merge index is context coded by CABAC. While in HEVC, only the first bin is context coded and the remaining bins are context by-pass coded.

2.2.2 Adaptive Motion Vector Difference Resolution

In HEVC, motion vector differences (MVDs) (between the motion vector and predicted motion vector of a PU) are signalled in units of quarter luma samples when use_integer_mv_flag is equal to 0 in the slice header. In the JEM, a locally adaptive motion vector resolution (LAMVR) is introduced. In the JEM, MVD can be coded in units of quarter luma samples, integer luma samples or four luma samples. The MVD resolution is controlled at the coding unit (CU) level, and MVD resolution flags are conditionally signalled for each CU that has at least one non-zero MVD components.

For a CU that has at least one non-zero MVD components, a first flag is signalled to indicate whether quarter luma sample MV precision is used in the CU. When the first flag (equal to 1) indicates that quarter luma sample MV precision is not used, another flag is signalled to indicate whether integer luma sample MV precision or four luma sample MV precision is used.

When the first MVD resolution flag of a CU is zero, or not coded for a CU (meaning all MVDs in the CU are zero), the quarter luma sample MV resolution is used for the CU. When a CU uses integer-luma sample MV precision or four-luma-sample MV precision, the MVPs in the AMVP candidate list for the CU are rounded to the corresponding precision.

In the encoder, CU-level RD checks are used to determine which MVD resolution is to be used for a CU. That is, the CU-level RD check is performed three times for each MVD resolution. To accelerate encoder speed, the following encoding schemes are applied in the JEM.

During RD check of a CU with normal quarter luma sample MVD resolution, the motion information of the current CU (integer luma sample accuracy) is stored. The stored motion information (after rounding) is used as the starting point for further small range motion vector refinement during the RD check for the same CU with integer luma sample and 4 luma sample MVD resolution so that the time-consuming motion estimation process is not duplicated three times.

RD check of a CU with 4 luma sample MVD resolution is conditionally invoked. For a CU, when RD cost integer luma sample MVD resolution is much larger than that of quarter luma sample MVD resolution, the RD check of 4 luma sample MVD resolution for the CU is skipped.

2.2.3 Higher Motion Vector Storage Accuracy

In HEVC, motion vector accuracy is one-quarter pel (one-quarter luma sample and one-eighth chroma sample for 4:2:0 video). In the JEM, the accuracy for the internal motion vector storage and the merge candidate increases to $\frac{1}{16}$ pel. The higher motion vector accuracy ($\frac{1}{16}$ pel) is used in motion compensation inter prediction for the CU coded with skip/merge mode. For the CU coded with normal AMVP mode, either the integer-pel or quarter-pel motion is used, as described in section 3.2.2.

SHVC upsampling interpolation filters, which have same filter length and normalization factor as HEVC motion compensation interpolation filters, are used as motion compensation interpolation filters for the additional fractional pel positions. The chroma component motion vector accuracy is $\frac{1}{32}$ sample in the JEM, the additional interpolation filters of $\frac{1}{32}$ pel fractional positions are derived by using the average of the filters of the two neighbouring $\frac{1}{16}$ pel fractional positions.

2.2.4 Overlapped Block Motion Compensation

Figure 12:
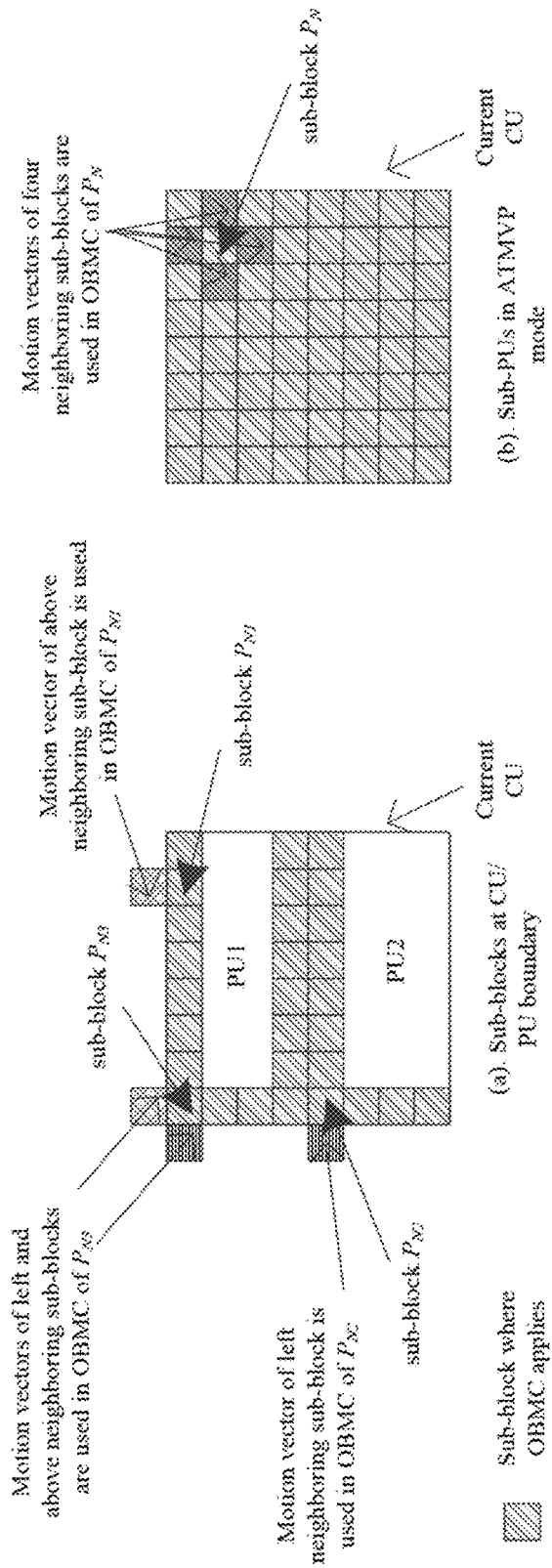
FIG. 12 is an illustration of sub-blocks where OBMC applies.

Overlapped Block Motion Compensation (OBMC) has previously been used in H.263. In the JEM, unlike in H.263, OBMC can be switched on and off using syntax at the CU level. When OBMC is used in the JEM, the OBMC is performed for all motion compensation (MC) block boundaries except the right and bottom boundaries of a CU. Moreover, it is applied for both the luma and chroma components. In the JEM, a MC block is corresponding to a coding block. When a CU is coded with sub-CU mode (includes sub-CU merge, affine and FRUC mode), each sub-block of the CU is a MC block. To process CU boundaries in a uniform fashion, OBMC is performed at sub-block level for all MC block boundaries, where sub-block size is set equal to 4×4, as illustrated in FIG. 12.

When OBMC applies to the current sub-block, besides current motion vectors, motion vectors of four connected neighbouring sub-blocks, if available and are not identical to the current motion vector, are also used to derive prediction block for the current sub-block. These multiple prediction blocks based on multiple motion vectors are combined to generate the final prediction signal of the current sub-block.

Prediction block based on motion vectors of a neighbouring sub-block is denoted as $P_N$, with N indicating an index for the neighbouring above, below, left and right sub-blocks and prediction block based on motion vectors of the current sub-block is denoted as $P_C$. When $P_N$ is based on the motion information of a neighbouring sub-block that contains the same motion information to the current sub-block, the OBMC is not performed from $P_N$. Otherwise, every sample of $P_N$ is added to the same sample in $P_C$, i.e., four rows/columns of $P_N$ are added to $P_C$. The weighting factors {¼, ⅛, ¹⁄₁₆, ¹⁄₃₂} are used for $P_N$ and the weighting factors {¾, ⅞, ¹⁵⁄₁₆, ³¹⁄₃₂} are used for $P_C$. The exception are small MC blocks, (i.e., when height or width of the coding block is equal to 4 or a CU is coded with sub-CU mode), for which only two rows/columns of $P_N$ are added to $P_C$. In this case weighting factors {¼, ⅛} are used for $P_N$ and weighting factors {¾, ⅞} are used for $P_C$. For $P_N$ generated based on motion vectors of vertically (horizontally) neighbouring sub-block, samples in the same row (column) of $P_N$ are added to $P_C$ with a same weighting factor.

In the JEM, for a CU with size less than or equal to 256 luma samples, a CU level flag is signalled to indicate whether OBMC is applied or not for the current CU. For the CUs with size larger than 256 luma samples or not coded with AMVP mode, OBMC is applied by default. At the encoder, when OBMC is applied for a CU, its impact is taken into account during the motion estimation stage. The prediction signal formed by OBMC using motion information of the top neighbouring block and the left neighbouring block is used to compensate the top and left boundaries of the original signal of the current CU, and then the normal motion estimation process is applied.

2.2.5 Local Illumination Compensation

Local Illumination Compensation (LIC) is based on a linear model for illumination changes, using a scaling factor a and an offset b. And it is enabled or disabled adaptively for each inter-mode coded coding unit (CU).

Figure 13:
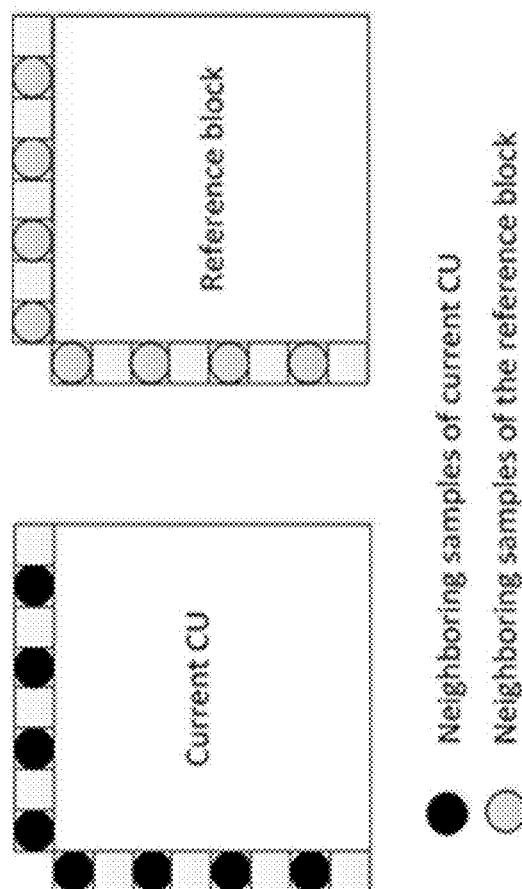
FIG. 13 shows an example of neighboring samples used for deriving IC parameters.

When LIC applies for a CU, a least square error method is employed to derive the parameters a and b by using the neighbouring samples of the current CU and their corresponding reference samples. More specifically, as illustrated in FIG. 13, the subsampled (2:1 subsampling) neighbouring samples of the CU and the corresponding samples (identified by motion information of the current CU or sub-CU) in the reference picture are used. The IC parameters are derived and applied for each prediction direction separately.

When a CU is coded with merge mode, the LIC flag is copied from neighbouring blocks, in a way similar to motion information copy in merge mode; otherwise, an LIC flag is signalled for the CU to indicate whether LIC applies or not.

When LIC is enabled for a picture, additional CU level RD check is needed to determine whether LIC is applied or not for a CU. When LIC is enabled for a CU, mean-removed sum of absolute difference (MR-SAD) and mean-removed sum of absolute Hadamard-transformed difference (MR-SATD) are used, instead of SAD and SATD, for integer pel motion search and fractional pel motion search, respectively.

To reduce the encoding complexity, the following encoding scheme is applied in the JEM.

LIC is disabled for the entire picture when there is no obvious illumination change between a current picture and its reference pictures. To identify this situation, histograms of a current picture and every reference picture of the current picture are calculated at the encoder. If the histogram difference between the current picture and every reference picture of the current picture is smaller than a given threshold, LIC is disabled for the current picture; otherwise, LIC is enabled for the current picture.

2.2.6 Affine Motion Compensation Prediction

Figure 14:
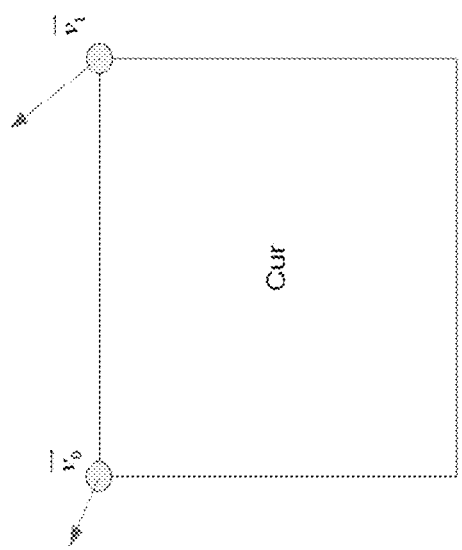
FIG. 14 shows an example of simplified affine motion model.

In HEVC, only translation motion model is applied for motion compensation prediction (MCP). While in the real world, there are many kinds of motion, e.g. zoom in/out, rotation, perspective motions and the other irregular motions. In the JEM, a simplified affine transform motion compensation prediction is applied. As shown FIG. 14, the affine motion field of the block is described by two control point motion vectors.

The motion vector field (MVF) of a block is described by the following equation:

$$\begin{cases} v_x = \frac{(v_{1x} - v_{0x})}{w} x - \frac{(v_{1y} - v_{0y})}{w} y + v_{0x} \\ v_y = \frac{(v_{1y} - v_{0y})}{w} x + \frac{(v_{1x} - v_{0x})}{w} y + v_{0y} \end{cases} \quad (1)$$

where $(v_{0x}, v_{0y})$ is motion vector of the top-left corner control point, and $(v_{1x}, v_{1y})$ is motion vector of the top-right corner control point.

In order to further simplify the motion compensation prediction, sub-block based affine transform prediction is applied. The sub-block size M×N is derived as in Equation 2, where MvPre is the motion vector fraction accuracy (1/16 in JEM), $(v_{2x}, v_{2y})$ is motion vector of the bottom-left control point, calculated according to Equation 1.

$$\begin{cases} M = \text{clip3}\left(4, w, \frac{w \times MvPre}{\max(\text{abs}(v_{1x} - v_{0x}), \text{abs}(v_{1y} - v_{0y}))}\right) \\ N = \text{clip3}\left(4, h, \frac{h \times MvPre}{\max(\text{abs}(v_{2x} - v_{0x}), \text{abs}(v_{2y} - v_{0y}))}\right) \end{cases} \quad (2)$$

After derived by Equation 2, M and N should be adjusted downward if necessary to make it a divisor of w and h, respectively.

Figure 15:
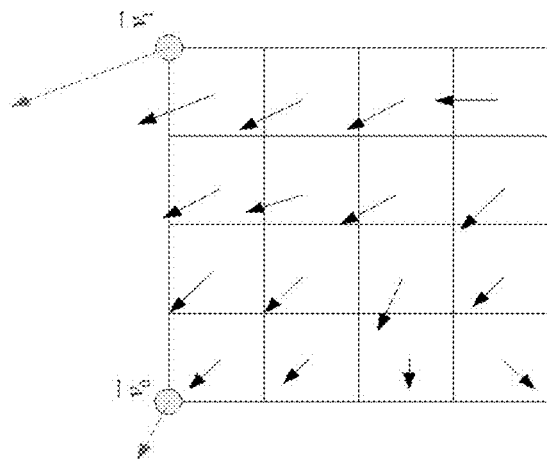
FIG. 15 shows an example of affine MVF per sub-block.

To derive motion vector of each M×N sub-block, the motion vector of the center sample of each sub-block, as shown in FIG. 15, is calculated according to Equation 1, and rounded to 1/16 fraction accuracy. Then the motion compensation interpolation filters mentioned in section 3.2.3 are applied to generate the prediction of each sub-block with derived motion vector.

After MCP, the high accuracy motion vector of each sub-block is rounded and saved as the same accuracy as the normal motion vector.

Figure 16:
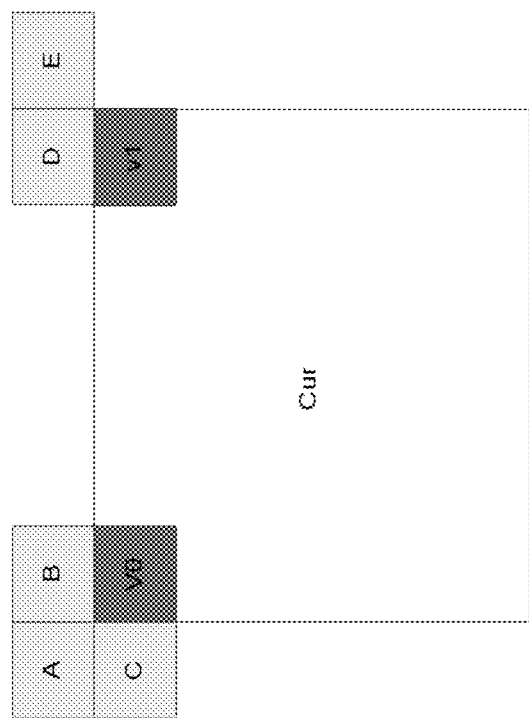
FIG. 16 shows an example of MVP for AF_INTER.

In the JEM, there are two affine motion modes: AF_INTER mode and AF_MERGE mode. For CUs with both width and height larger than 8, AF_INTER mode can be applied. An affine flag in CU level is signalled in the bitstream to indicate whether AF_INTER mode is used. In this mode, a candidate list with motion vector pair $\{(v_0, v_1)|v_0=\{v_A, v_B, v_C\}, v_1=\{v_D, v_E\}\}$ is constructed using the neighbour blocks. As shown in FIG. 16, $v_0$ is selected from the motion vectors of the block A, B or C. The motion vector from the neighbour block is scaled according to the reference list and the relationship among the POC of the reference for the neighbour block, the POC of the reference for the current CU and the POC of the current CU. And the approach to select $v_1$ from the neighbour block D and E is similar. If the number of candidate list is smaller than 2, the list is padded by the motion vector pair composed by duplicating each of the AMVP candidates. When the candidate list is larger than 2, the candidates are firstly sorted according to the consistency of the neighbouring motion vectors (similarity of the two motion vectors in a pair candidate) and only the first two candidates are kept. An RD cost check is used to determine which motion vector pair candidate is selected as the control point motion vector prediction (CPMVP) of the current CU. And an index indicating the position of the CPMVP in the candidate list is signalled in the bitstream. After the CPMVP of the current affine CU is determined, affine motion estimation is applied and the control point motion vector (CPMV) is found. Then the difference of the CPMV and the CPMVP is signalled in the bitstream.

Figures 17A, 17B:
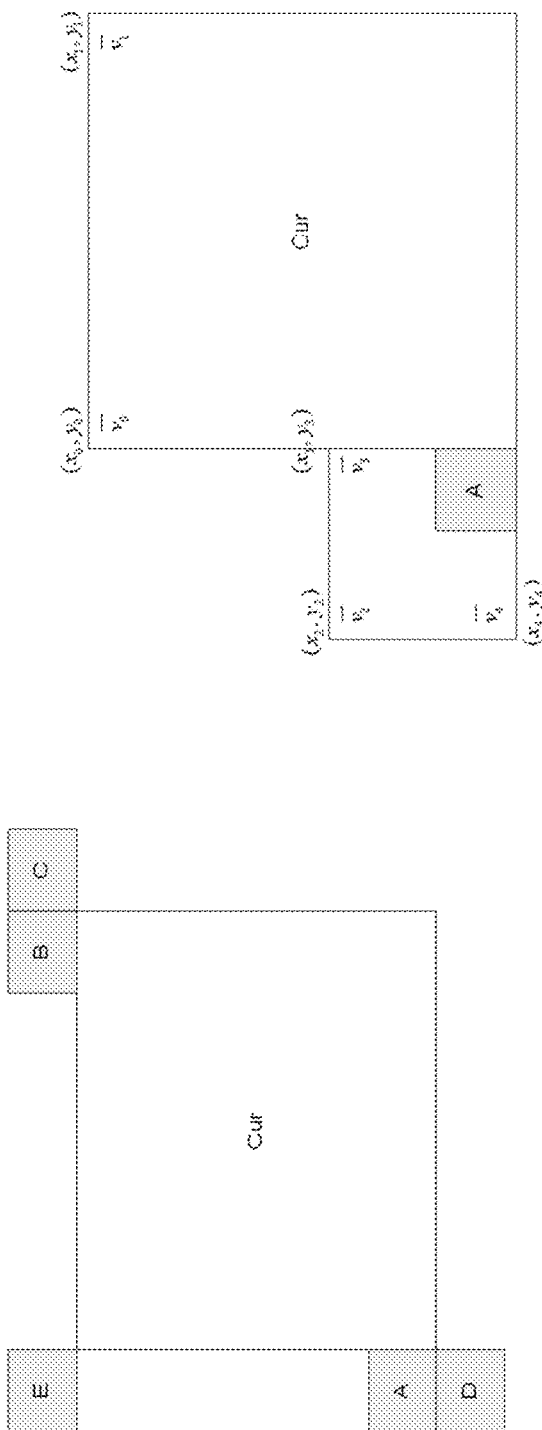
FIGS. 17A-17B show examples of candidates for AF_MERGE.

When a CU is applied in AF_MERGE (affine merge) mode, it gets the first block coded with affine mode from the valid neighbour reconstructed blocks. And the selection order for the candidate block is from left, above, above right, left bottom to above left as shown in FIG. 17A. If the neighbour left bottom block A is coded in affine mode as shown in FIG. 17B, the motion vectors v_2, v_3 and v_4 of the top left corner, above right corner and left bottom corner of the CU which contains the block A are derived. And the motion vector v_0 of the top left corner on the current CU is calculated according to v_2, v_3 and v_4. Secondly, the motion vector v_(1) of the above right of the current CU is calculated.

After the CPMV of the current CU $v_0$ and $v_1$ are derived, according to the simplified affine motion model Equation 1, the MVF of the current CU is generated. In order to identify whether the current CU is coded with AF_MERGE mode, an affine flag is signalled in the bitstream when there is at least one neighbour block is coded in affine mode.

2.2.7 Pattern Matched Motion Vector Derivation

Pattern matched motion vector derivation (PMMVD) mode is a special merge mode based on Frame-Rate Up Conversion (FRUC) techniques. With this mode, motion information of a block is not signalled but derived at decoder side.

A FRUC flag is signalled for a CU when its merge flag is true. When the FRUC flag is false, a merge index is signalled and the regular merge mode is used. When the FRUC flag is true, an additional FRUC mode flag is signalled to indicate which method (bilateral matching or template matching) is to be used to derive motion information for the block.

At encoder side, the decision on whether using FRUC merge mode for a CU is based on RD cost selection as done for normal merge candidate. That is the two matching modes (bilateral matching and template matching) are both checked for a CU by using RD cost selection. The one leading to the minimal cost is further compared to other CU modes. If a FRUC matching mode is the most efficient one, FRUC flag is set to true for the CU and the related matching mode is used.

Motion derivation process in FRUC merge mode has two steps. A CU-level motion search is first performed, then followed by a Sub-CU level motion refinement. At CU level, an initial motion vector is derived for the whole CU based on bilateral matching or template matching. First, a list of MV candidates is generated and the candidate which leads to the minimum matching cost is selected as the starting point for further CU level refinement. Then a local search based on bilateral matching or template matching around the starting point is performed and the MV results in the minimum matching cost is taken as the MV for the whole CU. Subsequently, the motion information is further refined at sub-CU level with the derived CU motion vectors as the starting points.

Figure 18:
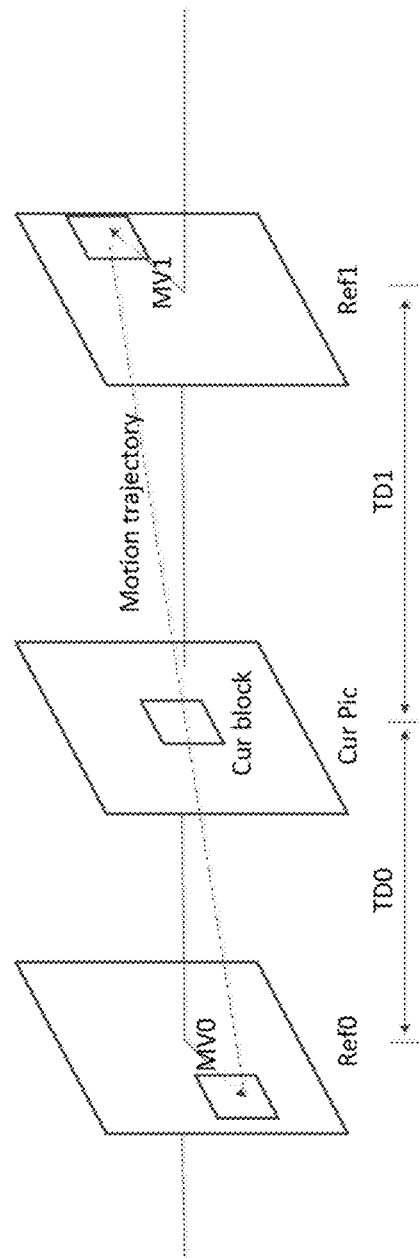
FIG. 18 shows an example of Bilateral matching.

As shown in the FIG. 18, the bilateral matching is used to derive motion information of the current CU by finding the closest match between two blocks along the motion trajectory of the current CU in two different reference pictures. Under the assumption of continuous motion trajectory, the motion vectors MV0 and MV1 pointing to the two reference blocks shall be proportional to the temporal distances, i.e., TD0 and TD1, between the current picture and the two reference pictures. As a special case, when the current picture is temporally between the two reference pictures and the temporal distance from the current picture to the two reference pictures is the same, the bilateral matching becomes mirror based bi-directional MV.

Figure 19:
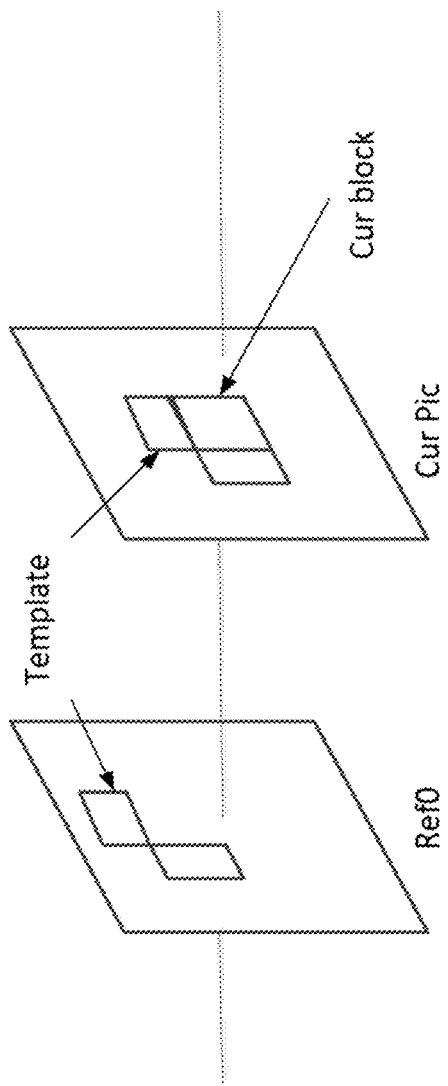
FIG. 19 shows an example of Template matching.

As shown in FIG. 19, template matching is used to derive motion information of the current CU by finding the closest match between a template (top and/or left neighbouring blocks of the current CU) in the current picture and a block (same size to the template) in a reference picture. Except the aforementioned FRUC merge mode, the template matching is also applied to AMVP mode. In the JEM, as done in HEVC, AMVP has two candidates. With template matching method, a new candidate is derived. If the newly derived candidate by template matching is different to the first existing AMVP candidate, it is inserted at the very beginning of the AMVP candidate list and then the list size is set to two (meaning remove the second existing AMVP candidate). When applied to AMVP mode, only CU level search is applied.

2.2.7.1 CU Level MV Candidate Set

The MV candidate set at CU level consists of:
  (i) Original AMVP candidates if the current CU is in AMVP mode
  (ii) all merge candidates,
  (iii) several MVs in the interpolated MV field, which is introduced in section 3.2.10.
  (iv) top and left neighbouring motion vectors When using bilateral matching, each valid MV of a merge candidate is used as an input to generate a MV pair with the assumption of bilateral matching. For example, one valid MV of a merge candidate is (MVa, refa) at reference list A. Then the reference picture refb of its paired bilateral MV is found in the other reference list B so that refa and refb are temporally at different sides of the current picture. If such a refb is not available in reference list B, refb is determined as a reference which is different from refa and its temporal distance to the current picture is the minimal one in list B. After refb is determined, MVb is derived by scaling MVa based on the temporal distance between the current picture and refa, refb.

Four MVs from the interpolated MV field are also added to the CU level candidate list. More specifically, the interpolated MVs at the position (0, 0), (W/2, 0), (0, H/2) and (W/2, H/2) of the current CU are added.

When FRUC is applied in AMVP mode, the original AMVP candidates are also added to CU level MV candidate set.

At the CU level, up to 15 MVs for AMVP CUs and up to 13 MVs for merge CUs are added to the candidate list.

2.2.7.2 Sub-CU Level MV Candidate Set

The MV candidate set at sub-CU level consists of:
  (i) an MV determined from a CU-level search,
  (ii) top, left, top-left and top-right neighbouring MVs,
  (iii) scaled versions of collocated MVs from reference pictures,
  (iv) up to 4 ATMVP candidates,
  (v) up to 4 STMVP candidates The scaled MVs from reference pictures are derived as follows. All the reference pictures in both lists are traversed. The MVs at a collocated position of the sub-CU in a reference picture are scaled to the reference of the starting CU-level MV.

ATMVP and STMVP candidates are limited to the four first ones.

At the sub-CU level, up to 17 MVs are added to the candidate list.

2.2.7.3 Generation of Interpolated MV Field

Before coding a frame, interpolated motion field is generated for the whole picture based on unilateral ME. Then the motion field may be used later as CU level or sub-CU level MV candidates.

Figure 20:
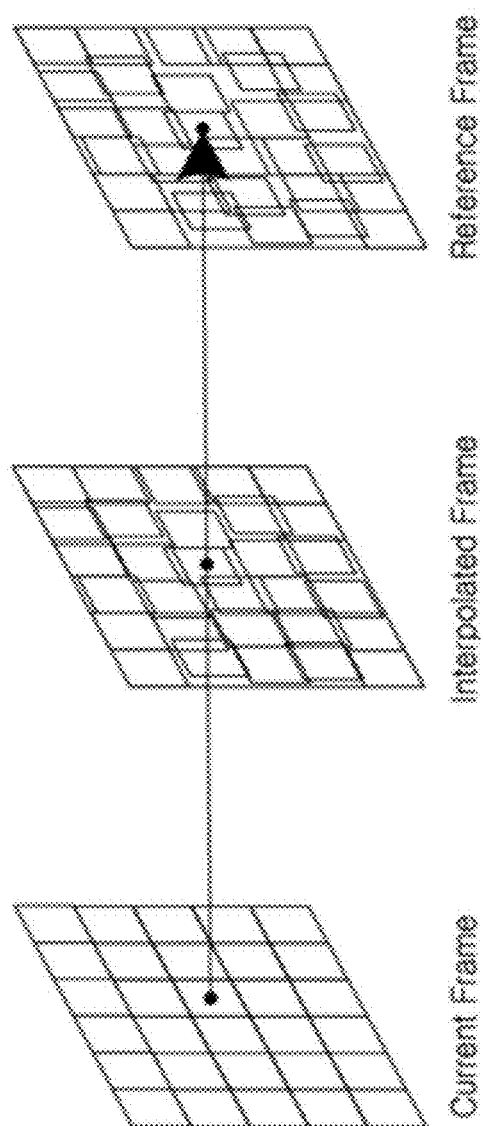
FIG. 20 shows an example of Unilateral ME in FRUC.

First, the motion field of each reference pictures in both reference lists is traversed at 4×4 block level. For each 4×4 block, if the motion associated to the block passing through a 4×4 block in the current picture (as shown in FIG. 20) and the block has not been assigned any interpolated motion, the motion of the reference block is scaled to the current picture according to the temporal distance TD0 and TD1 (the same way as that of MV scaling of TMVP in HEVC) and the scaled motion is assigned to the block in the current frame. If no scaled MV is assigned to a 4×4 block, the block's motion is marked as unavailable in the interpolated motion field.

2.2.7.4 Interpolation and Matching Cost

When a motion vector points to a fractional sample position, motion compensated interpolation is needed. To reduce complexity, bi-linear interpolation instead of regular 8-tap HEVC interpolation is used for both bilateral matching and template matching.

The calculation of matching cost is a bit different at different steps. When selecting the candidate from the candidate set at the CU level, the matching cost is the absolute sum difference (SAD) of bilateral matching or template matching. After the starting MV is determined, the matching cost C of bilateral matching at sub-CU level search is calculated as follows:

$$C = SAD + w \cdot (|MV_x - MV_x^s| + |MV_y - MV_y^s|) \quad (4)$$

where w is a weighting factor which is empirically set to 4, MV and $MV^s$ indicate the current MV and the starting MV, respectively. SAD is still used as the matching cost of template matching at sub-CU level search.

In FRUC mode, MV is derived by using luma samples only. The derived motion will be used for both luma and chroma for MC inter prediction. After MV is decided, final MC is performed using 8-taps interpolation filter for luma and 4-taps interpolation filter for chroma.

2.2.7.5 MV Refinement

MV refinement is a pattern based MV search with the criterion of bilateral matching cost or template matching cost. In the JEM, two search patterns are supported—an unrestricted center-biased diamond search (UCBDS) and an adaptive cross search for MV refinement at the CU level and sub-CU level, respectively. For both CU and sub-CU level MV refinement, the MV is directly searched at quarter luma sample MV accuracy, and this is followed by one-eighth luma sample MV refinement. The search range of MV refinement for the CU and sub-CU step are set equal to 8 luma samples.

2.2.7.6 Selection of Prediction Direction in Template Matching FRUC Merge Mode

In the bilateral matching merge mode, bi-prediction is always applied since the motion information of a CU is derived based on the closest match between two blocks along the motion trajectory of the current CU in two different reference pictures. There is no such limitation for the template matching merge mode. In the template matching merge mode, the encoder can choose among uni-prediction from list0, uni-prediction from list1 or bi-prediction for a CU. The selection is based on a template matching cost as follows:

If costBi<=factor*min (cost0, cost1)
   bi-prediction is used;
Otherwise, if cost0<=cost1
   uni-prediction from list0 is used;
Otherwise,
   uni-prediction from list1 is used;

where cost0 is the SAD of list0 template matching, cost1 is the SAD of list1 template matching and costBi is the SAD of bi-prediction template matching. The value of factor is equal to 1.25, which means that the selection process is biased toward bi-prediction.

The inter prediction direction selection is only applied to the CU-level template matching process.

2.2.8 Bi-Directional Optical Flow

Bi-directional Optical flow (BIO) is sample-wise motion refinement which is performed on top of block-wise motion compensation for bi-prediction. The sample-level motion refinement doesn't use signalling.

Let $I^{(k)}$ be the luma value from reference k (k=0, 1) after block motion compensation, and $\partial I^{(k)}/\partial x$, $\partial I^{(k)}/\partial y$ are horizontal and vertical components of the $I^{(k)}$ gradient, respectively. Assuming the optical flow is valid, the motion vector field $(v_x, v_y)$ is given by an equation $$\partial I^{(k)}/\partial t + v_x \partial I^{(k)}/\partial x + v_y \partial I^{(k)}/\partial y = 0 \quad (5)$$

Combining this optical flow equation with Hermite interpolation for the motion trajectory of each sample results in a unique third-order polynomial that matches both the function values $I^{(k)}$ and derivatives $\partial I^{(k)}/\partial x$, $\partial I^{(k)}/\partial y$ at the ends. The value of this polynomial at t=0 is the BIO prediction:

$$\text{pred}_{BIO} = \tfrac{1}{2} \cdot (I^{(0)} + I^{(1)} + v_x/2 \cdot (\tau_1 \partial I^{(1)}/\partial x - \tau_0 \partial I^{(0)}/\partial x) + v_y/2 \cdot (\tau_1 \partial I^{(1)}/\partial y - \tau_0 \partial I^{(0)}/\partial y)). \quad (6)$$

Figure 21:
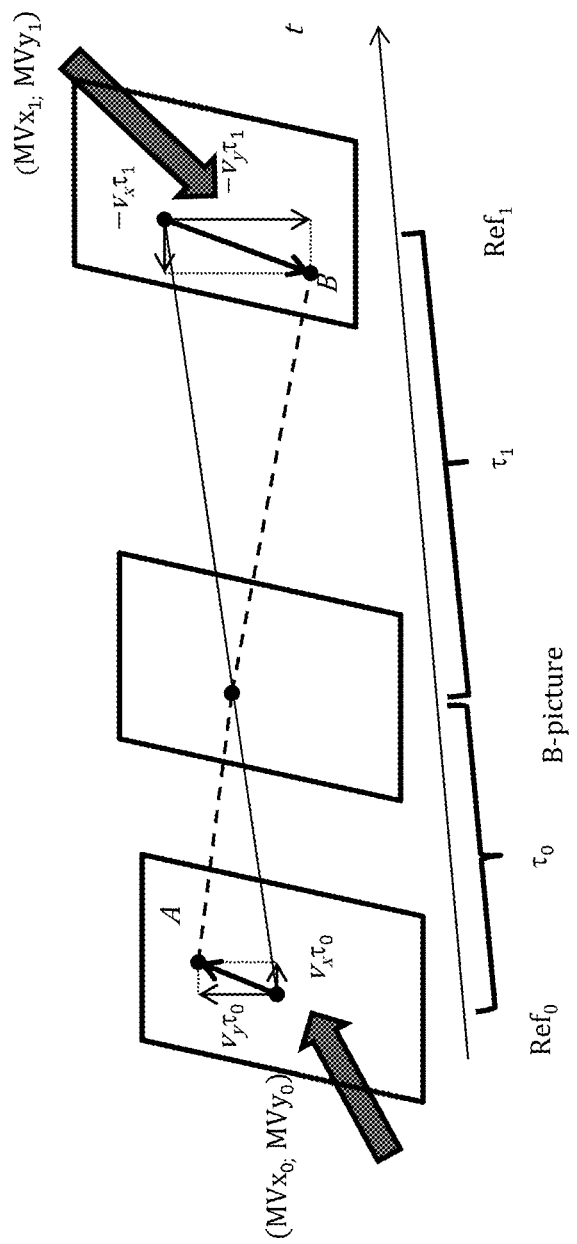
FIG. 21 shows an example of an Optical flow trajectory.

Here, $\tau_0$ and $\tau_1$ denote the distances to the reference frames as shown on a FIG. 21. Distances $\tau_0$ and $\tau_1$ are calculated based on POC for Ref0 and Ref1: $\tau_0$=POC(current)−POC(Ref0), $\tau_1$=POC(Ref1)−POC(current). If both predictions come from the same time direction (either both from the past or both from the future) then the signs are different (i.e., $\tau_0 \cdot \tau_1 < 0$). In this case, BIO is applied only if the prediction is not from the same time moment (i.e., $\tau_0 \neq \tau_1$), both referenced regions have non-zero motion ($MVx_0$, $MVy_0$, $MVx_1$, $MVy_1 \neq 0$) and the block motion vectors are proportional to the time distance ($MVx_0/MVx_1 = MVy_0/MVy_1 = -\tau_0/\tau_1$).

The motion vector field $(v_x, v_y)$ is determined by minimizing the difference Δ between values in points A and B (intersection of motion trajectory and reference frame planes on FIG. 9). Model uses only first linear term of a local Taylor expansion for Δ:

$$\Delta = (I^{(0)} - I^{(1)})_0 + v_x(\tau_1 \partial I^{(1)}/\partial x + \tau_0 \partial I^{(0)}/\partial x) + v_y(\tau_1 \partial I^{(1)}/\partial y + \tau_0 \partial I^{(0)}/\partial y)) \quad (7)$$

All values in Equation 7 depend on the sample location (i', j'), which was omitted from the notation so far. Assuming the motion is consistent in the local surrounding area, we minimize Δ inside the (2M+1)×(2M+1) square window Ω centered on the currently predicted point (i, j), where M is equal to 2:

$$(v_x, v_y) = \operatorname*{argmin}_{v_x, v_y} \sum_{[i', j'] \in \Omega} \Delta^2[i', j'] \quad (8)$$

For this optimization problem, the JEM uses a simplified approach making first a minimization in the vertical direction and then in the horizontal direction. This results in $$v\_x = (s\_1 + r) > m\,?\,\text{clip3}(-\text{thBIO}, \text{thBIO}, -s\_3/((s\_1+r))):0 \quad (9)$$

$$v\_y = (s\_5 + r) > m\,?\,\text{clip3}(-\text{thBIO}, \text{thBIO}, -(s\_6 - v\_x\, s\_2/2)/((s\_5+r))):0 \quad (10)$$

where, $$s_1 = \sum_{[i',j']\in\Omega} (\tau_1 \partial I^{(1)}/\partial x + \tau_0 \partial I^{(0)}/\partial x)^2; \quad (11)$$

$$s_3 = \sum_{[i',j']\in\Omega} (I^{(1)} - I^{(0)})(\tau_1 \partial I^{(1)}/\partial x + \tau_0 \partial I^{(0)}/\partial x);$$

$$s_2 = \sum_{[i',j']\in\Omega} (\tau_1 \partial I^{(1)}/\partial x + \tau_0 \partial I^{(0)}/\partial x)(\tau_1 \partial I^{(1)}/\partial + \tau_0 \partial I^{(0)}/\partial y);$$

$$s_5 = \sum_{[i',j']\in\Omega} (\tau_1 \partial I^{(1)}/\partial y + \tau_0 \partial I^{(0)}/\partial y)^2;$$

$$s_6 = \sum_{[i',j']\in\Omega} (I^{(1)} - I^{(0)})(\tau_1 \partial I^{(1)}/\partial y + \tau_0 \partial I^{(0)}/\partial y)$$

$$\text{Clip3}(x, y, z) = \begin{cases} x; & z < x \\ y; & z > y \\ z & \text{otherwise} \end{cases}$$

In order to avoid division by zero or a very small value, regularization parameters r and m are introduced in Equations 9 and 10.

$$r = 500 \cdot 4^{d-8} \quad (12)$$

$$m = 700 \cdot 4^{d-8} \quad (13)$$

Here d is bit depth of the video samples.

Figure 22A:
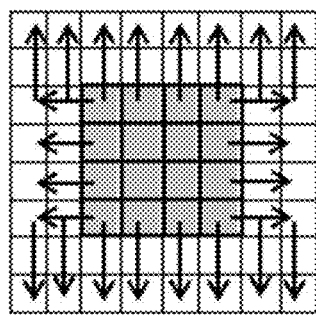
FIGS. 22A and 22B show BIO w/o block extension.
Figure 22B:
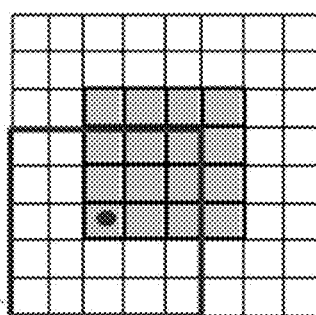

In order to keep the memory access for BIO the same as for regular bi-predictive motion compensation, all prediction and gradients values, $I^{(k)}$, $\partial I^{(k)}/\partial x$, $\partial I^{(k)}/\partial y$, are calculated only for positions inside the current block. In Equation 11, (2M+1)×(2M+1) square window Ω centered in currently predicted point on a boundary of predicted block needs to accesses positions outside of the block (as shown in FIG. 22A). In the JEM, values of $I^{(k)}$, $\partial I^{(k)}/\partial x$, $\partial I^{(k)}/\partial y$ outside of the block are set to be equal to the nearest available value inside the block. For example, this can be implemented as padding, as shown in FIG. 22B.

With BIO, it's possible that the motion field can be refined for each sample. To reduce the computational complexity, a block-based design of BIO is used in the JEM. The motion refinement is calculated based on 4×4 block. In the block-based BIO, the values of $s_n$ in Equation 11 of all samples in a 4×4 block are aggregated, and then the aggregated values of $s_n$ in are used to derived BIO motion vectors offset for the 4×4 block. More specifically, the following formula is used for block-based BIO derivation:

$$s_{1,b_k} = \sum_{(x,y)\in b_k} \sum_{[i',j']\in\Omega(x,y)} (\tau_1 \partial I^{(1)}/\partial x + \tau_0 \partial I^{(0)}/\partial x)^2; \quad (14)$$

-continued $$s_{3,b_k} = \sum_{(x,y)\in b_k} \sum_{[i',j]\in\Omega} (I^{(1)} - I^{(0)})(\tau_1 \partial I^{(1)}/\partial x + \tau_0 \partial I^{(0)}/\partial x);$$

$$s_{2,b_k} = \sum_{(x,y)\in b_k} \sum_{[i',j]\in\Omega} (\tau_1 \partial I^{(1)}/\partial x + \tau_0 \partial I^{(0)}/\partial x)$$

$$(\tau_1 \partial I^{(1)}/\partial y + \tau_0 \partial I^{(0)}/\partial y);$$

$$s_{5,b_k} = \sum_{(x,y)\in b_k} \sum_{[i',j]\in\Omega} (\tau_1 \partial I^{(1)}/\partial y + \tau_0 \partial I^{(0)}/\partial y)^2;$$

$$s_{6,b_k} = \sum_{(x,y)\in b_k} \sum_{[i',j]\in\Omega} (I^{(1)} - I^{(0)})(\tau_1 \partial I^{(1)}/\partial y + \tau_0 \partial I^{(0)}/\partial y)$$

where $b_k$ denotes the set of samples belonging to the k-th 4×4 block of the predicted block. $s_n$ in Equations 9 and 10 are replaced by $((s_{n,bk})>>4)$ to derive the associated motion vector offsets.

In some cases, MV regiment of BIO might be unreliable due to noise or irregular motion. Therefore, in BIO, the magnitude of MV regiment is clipped to a threshold value thBIO. The threshold value is determined based on whether the reference pictures of the current picture are all from one direction. If all the reference pictures of the current picture are from one direction, the value of the threshold is set to $12 \times 2^{14-d}$; otherwise, it is set to $12 \times 2^{13-d}$.

Gradients for BIO are calculated at the same time with motion compensation interpolation using operations consistent with HEVC motion compensation process (2D separable FIR). The input for this 2D separable FIR is the same reference frame sample as for motion compensation process and fractional position (fracX, fracY) according to the fractional part of block motion vector. In case of horizontal gradient ∂I/∂x signal first interpolated vertically using BIOfilterS corresponding to the fractional position fracY with de-scaling shift d−8, then gradient filter BIOfilterG is applied in horizontal direction corresponding to the fractional position fracX with de-scaling shift by 18−d. In case of vertical gradient ∂I/∂y first gradient filter is applied vertically using BIOfilterG corresponding to the fractional position fracY with de-scaling shift d−8, then signal displacement is performed using BIOfilterS in horizontal direction corresponding to the fractional position fracX with de-scaling shift by 18−d. The length of interpolation filter for gradients calculation BIOfilterG and signal displacement BIOfilterF is shorter (6-tap) in order to maintain reasonable complexity. Table 1 shows the filters used for gradients calculation for different fractional positions of block motion vector in BIO. Table 2 shows the interpolation filters used for prediction signal generation in BIO.

TABLE 1

Filters for gradients calculation in BIO

| Fractional pel position | Interpolation filter for gradient(BIOfilterG) |
|---|---|
| 0 | {8, −39, −3, 46, −17, 5} |
| 1/16 | {8, −32, −13, 50, −18, 5} |
| 1/8 | {7, −27, −20, 54, −19, 5} |
| 3/16 | {6, −21, −29, 57, −18, 5} |
| 1/4 | {4, −17, −36, 60, −15, 4} |
| 5/16 | {3, −9, −44, 61, −15, 4} |
| 3/8 | {1, −4, −48, 61, −13, 3} |
| 7/16 | {0, 1, −54, 60, −9, 2} |
| 1/2 | {−1, 4, −57, 57, −4, 1} |

TABLE 2

Interpolation filters for prediction signal generation in BIO

| Fractional pel position | Interpolation filter for prediction signal(BIOfilterS) |
|---|---|
| 0 | {0, 0, 64, 0, 0, 0} |
| 1/16 | {1, −3, 64, 4, −2, 0} |
| 1/8 | {1, −6, 62, 9, −3, 1} |
| 3/16 | {2, −8, 60, 14, −5, 1} |
| 1/4 | {2, −9, 57, 19, −7, 2} |
| 5/16 | {3, −10, 53, 24, −8, 2} |
| 3/8 | {3, −11, 50, 29, −9, 2} |
| 7/16 | {3, −11, 44, 35, −10, 3} |
| 1/2 | {3, −10, 35, 44, −11, 3} |

In the JEM, BIO is applied to all bi-predicted blocks when the two predictions are from different reference pictures. When LIC is enabled for a CU, BIO is disabled.

In the JEM, OBMC is applied for a block after normal MC process. To reduce the computational complexity, BIO is not applied during the OBMC process. This means that BIO is only applied in the MC process for a block when using its own MV and is not applied in the MC process when the MV of a neighboring block is used during the OBMC process.

2.2.9 Decoder-Side Motion Vector Refinement

In bi-prediction operation, for the prediction of one block region, two prediction blocks, formed using a motion vector (MV) of list0 and a MV of list1, respectively, are combined to form a single prediction signal. In the decoder-side motion vector refinement (DMVR) method, the two motion vectors of the bi-prediction are further refined by a bilateral template matching process. The bilateral template matching applied in the decoder to perform a distortion-based search between a bilateral template and the reconstruction samples in the reference pictures in order to obtain a refined MV without transmission of additional motion information.

Figure 23:
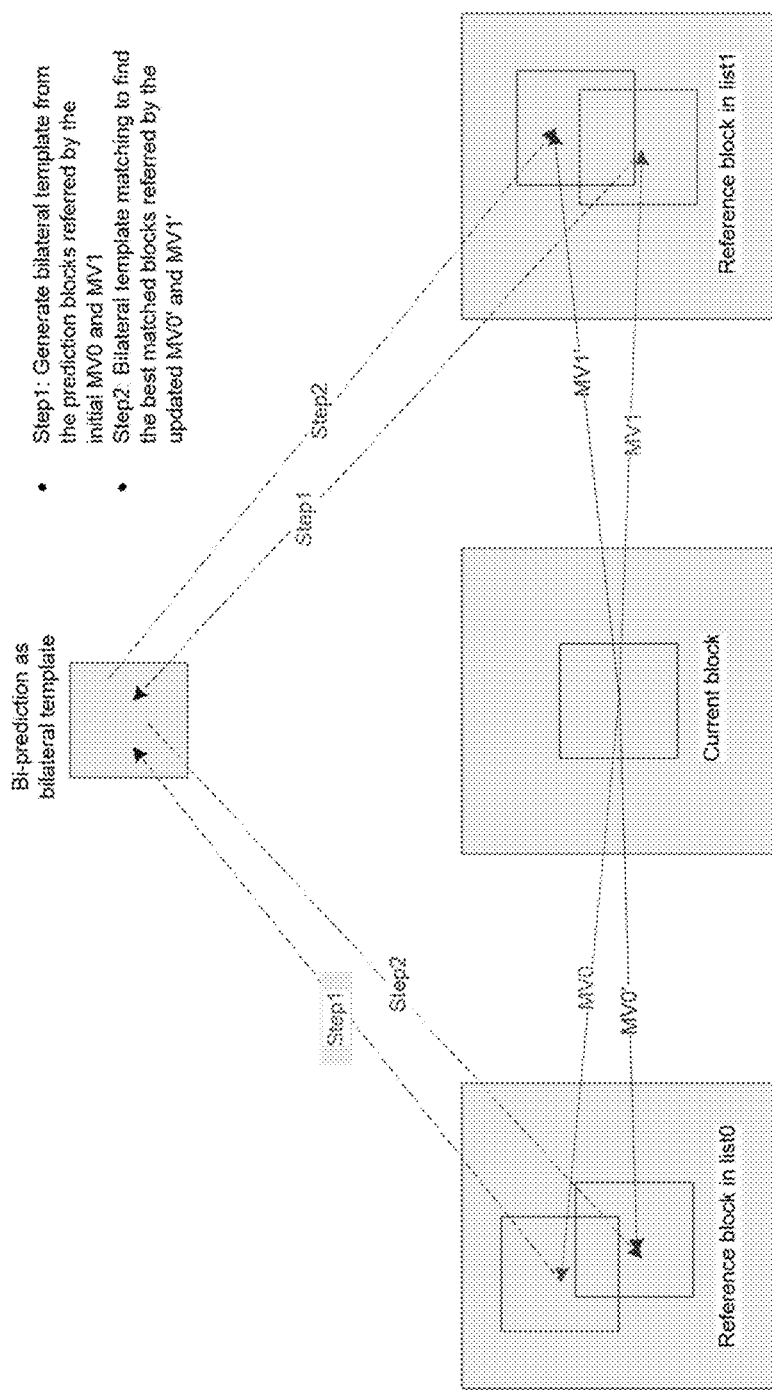
FIG. 23 shows an example of DMVR based on bilateral template matching.

In DMVR, a bilateral template is generated as the weighted combination (i.e. average) of the two prediction blocks, from the initial MV0 of list0 and MV1 of list1, respectively, as shown in FIG. 23. The template matching operation consists of calculating cost measures between the generated template and the sample region (around the initial prediction block) in the reference picture. For each of the two reference pictures, the MV that yields the minimum template cost is considered as the updated MV of that list to replace the original one. In the JEM, nine MV candidates are searched for each list. The nine MV candidates include the original MV and 8 surrounding MVs with one luma sample offset to the original MV in either the horizontal or vertical direction, or both. Finally, the two new MVs, i.e., MV0' and MV1' as shown in FIG. 23, are used for generating the final bi-prediction results. A sum of absolute differences (SAD) is used as the cost measure. Please note that when calculating the cost of a prediction block generated by one surrounding MV, the rounded MV (to integer pel) is actually used to obtain the prediction block instead of the real MV.

DMVR is applied for the merge mode of bi-prediction with one MV from a reference picture in the past and another from a reference picture in the future, without the transmission of additional syntax elements. In the JEM, when LIC, affine motion, FRUC, or sub-CU merge candidate is enabled for a CU, DMVR is not applied.

2.3 CABAC Modifications

In the JEM, CABAC contains the following three major changes compared to the design in HEVC:

Modified context modeling for transform coefficients

Multi-hypothesis probability estimation with context-dependent updating speed

Adaptive initialization for context models

2.3.1 Context Modeling for Transform Coefficients

In HEVC, transform coefficients of a coding block are coded using non-overlapped coefficient groups (CGs), and each CG contains the coefficients of a 4×4 block of a coding block. The CGs inside a coding block, and the transform coefficients within a CG, are coded according to pre-defined scan orders. The coding of transform coefficient levels of a CG with at least one non-zero transform coefficient may be separated into multiple scan passes. In the first pass, the first bin (denoted by bin0, also referred as significant_coeff_flag, which indicates the magnitude of the coefficient is larger than 0) is coded. Next, two scan passes for context coding the second/third bins (denoted by bin1 and bin2, respectively, also referred as coeff_abs_greater1_flag and coeff_abs_greater2_flag) may be applied. Finally, two more scan passes for coding the sign information and the remaining values (also referred as coeff_abs_level_remaining) of coefficient levels are invoked, if necessary. Only bins in the first three scan passes are coded in a regular mode and those bins are termed regular bins in the following descriptions.

Figure 24:
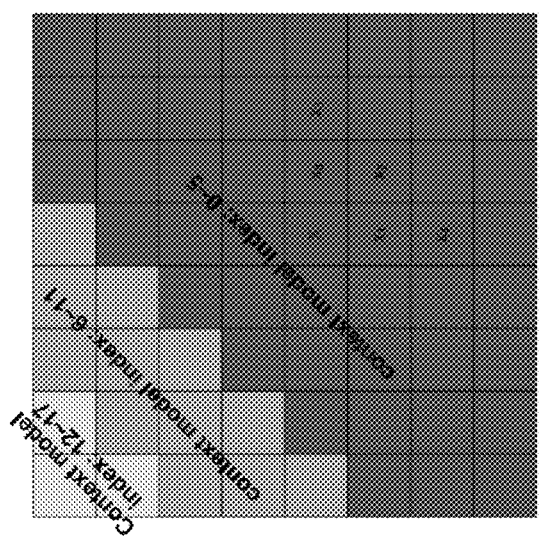
FIG. 24 shows an example of context adaptive coding.

In the JEM, the context modeling for regular bins is changed. When coding bin i in the i-th scan pass (i being 0, 1, 2), the context index is dependent on the values of the i-th bins of previously coded coefficients in the neighbourhood covered by a local template. More specifically, the context index is determined based on the sum of the i-th bins of neighbouring coefficients. As depicted in FIG. 23, the local template contains up to five spatial neighbouring transform coefficients wherein x indicates the position of current transform coefficient and xi (i being 0 to 4) indicates its five neighbours. To capture the characteristics of transform coefficients at different frequencies, one coding block may be split into up to three regions and the splitting method is fixed regardless of the coding block sizes. For example, when coding bin0 of luma transform coefficients, as depicted in FIG. 24, one coding block is split into three regions marked with different colours, and the context index assigned to each region is listed. Luma and chroma components are treated in a similar way but with separate sets of context models. Moreover, the context model selection for bin0 (i.e., significant flags) of the luma component is further dependent on transform size.

2.3.3 Initialization of Context Models

Instead of using fixed tables for context model initialization in HEVC, the initial probability states of context models for inter-coded slices can be initialized by copying states from previously coded pictures. More specifically, after coding a centrally-located CTU of each picture, the probability states of all context models are stored for potential use as the initial states of the corresponding context models on later pictures. In the JEM, the set of initial states for each inter-coded slice is copied from the stored states of a previously coded picture that has the same slice type and the same slice-level QP as the current slice. This lacks loss robustness, but is used in the current JEM scheme for coding efficiency experiment purposes.

2.4 Related Methods

Extended LAMVR was proposed in JVET-J0024, wherein supported motion vector resolutions range from ¼-pel to 4-pel (¼-pel, ½-pel, 1-pel, 2-pel and 4-pel). Information about the motion vector resolution is signaled at the CU level when MVD information is signaled.

Depending on the resolution of CU, both motion vector (MV) and motion vector predictor (MVP) of the CU are adjusted. If applied motion vector resolution is denoted as R (R could be ¼, ½, 1, 2, 4), MV ($MV_x$, $MV_y$) and MVP ($MVP_x$, $MVP_y$) are represented as follows:

$$(MV_x, MV_y) = (\text{Round}(MV_x/(R*4))*(R*4), \text{Round}(MV_y/(R*4))*(R*4)) \quad (17)$$

$$(MVP_x, MVP_y) = (\text{Round}(MVP_x/(R*4))*(R*4), \text{Round}(MVP_y/(R*4))*(R*4)) \quad (18)$$

Since the motion vector predictor and MV are both adjusted by an adaptive resolution, MVD ($MVD_x$, $MVD_y$) is also aligned to the resolution and, is signaled according to the resolution as follows:

$$(MVD_x, MVD_y) = ((MV_x - MVP_x)/(R*4), (MV_y - MVP_y)/R*4)) \quad (19)$$

In this proposal, motion vector resolution index (MVR index) indicates MVP index as well as the motion vector resolution. As result, the proposed method has no MVP index signaling. Below table shows what each value of MVR index represents.

TABLE 3

| MVR Index | 0 | 1 | 2 | 3 | 4 |
|---|---|---|---|---|---|
| Resolution (R) in pel | ¼ | ½ | 1 | 2 | 4 |
| $N^{th}$ MVP | $1^{st}$ MVP | $2^{nd}$ MVP | $3^{rd}$ MVP | $4^{th}$ MVP | $5^{th}$ MVP |

In case of bi-prediction, AMVR has 3 modes for every resolution. AMVR Bi-Index indicates whether $MVD_x$, $MVD_y$ of each reference list (list 0 or list 1) are signaled or not. AMVR Bi-Index in this proposal is defined as below table.

TABLE 4

| AMVR Bi-Index | ($MVD_x$, $MVD_y$) of list 0 | ($MVD_x$, $MVD_y$) of list 1 |
|---|---|---|
| 0 | Signaled | Signaled |
| 1 | Not signaled | Signaled |
| 2 | Signaled | Not signaled |

3. PROBLEMS

In LAMVR related methods, the allowable MVD resolutions are restricted to be integral multiple of ¼ pel precision, which is not necessary. Generalized MVD resolutions may be helpful.

On the other hand, in LAMVR related methods, one index is signaled to indicate the selected MVD resolution, which is applied to both reference lists in bi-prediction case. This may be inefficient because a coarse MVD resolution in one reference list plus a fine MVD resolution in the other reference list may be a better trade-off in many cases.

Meanwhile, if a MVD precision is selected, the MVP is also rounded to the same precision even if MVP has a higher precision, this may be inefficient.

4. EXAMPLE SOLUTIONS AND EMBODIMENTS

To tackle the problems, we propose generalized MVD resolutions, and separate MVD resolution control for the two reference lists in bi-prediction case.

The example solutions below should be considered as examples to explain general concepts. These solutions should not be interpreted in a narrow way. Furthermore, these solutions can be combined in any manner to produce bitstream representations, and use bitstreams to produce decoded video.

Denote prec0 and prec1 as the MVD precision (or resolution) of reference list 0 and reference list 1 respectively. When preci is equal to N, it means the MVD in reference list i is with N pel precision. Denote MRSet0 and MRSet1 as the candidate MVD resolution set of reference list 0 and reference list 1 respectively.
1. It is proposed that MVD resolution can be with N or 1/N pel precision, wherein N is a positive integer.
    a. In one example, the candidate MVD resolution set includes 6, 4, 2, 1, ½, ¼.
    b. In another example, the candidate MVD resolution set includes 4, 3, 2, 1, ½, ¼.
2. It is proposed that the set of allowed MV and/or MVP and/or MVD precisions may depend on coded information of the current block.
    a. In one example, it may depend on the quantization parameters (QPs) of the current block. For larger QPs, larger precisions (e.g., 1-pel, 4-pel and/or 8-pel) may be enabled. While for smaller QPs, smaller precisions (e.g., ⅛-pel, ¼-pel and/or ½-pel) may be enabled.
    b. In one example, it may depend on the coding mode of the current block, such as whether the current block is coded with affine mode or intra-block copy (IBC) mode.

Figure 25:
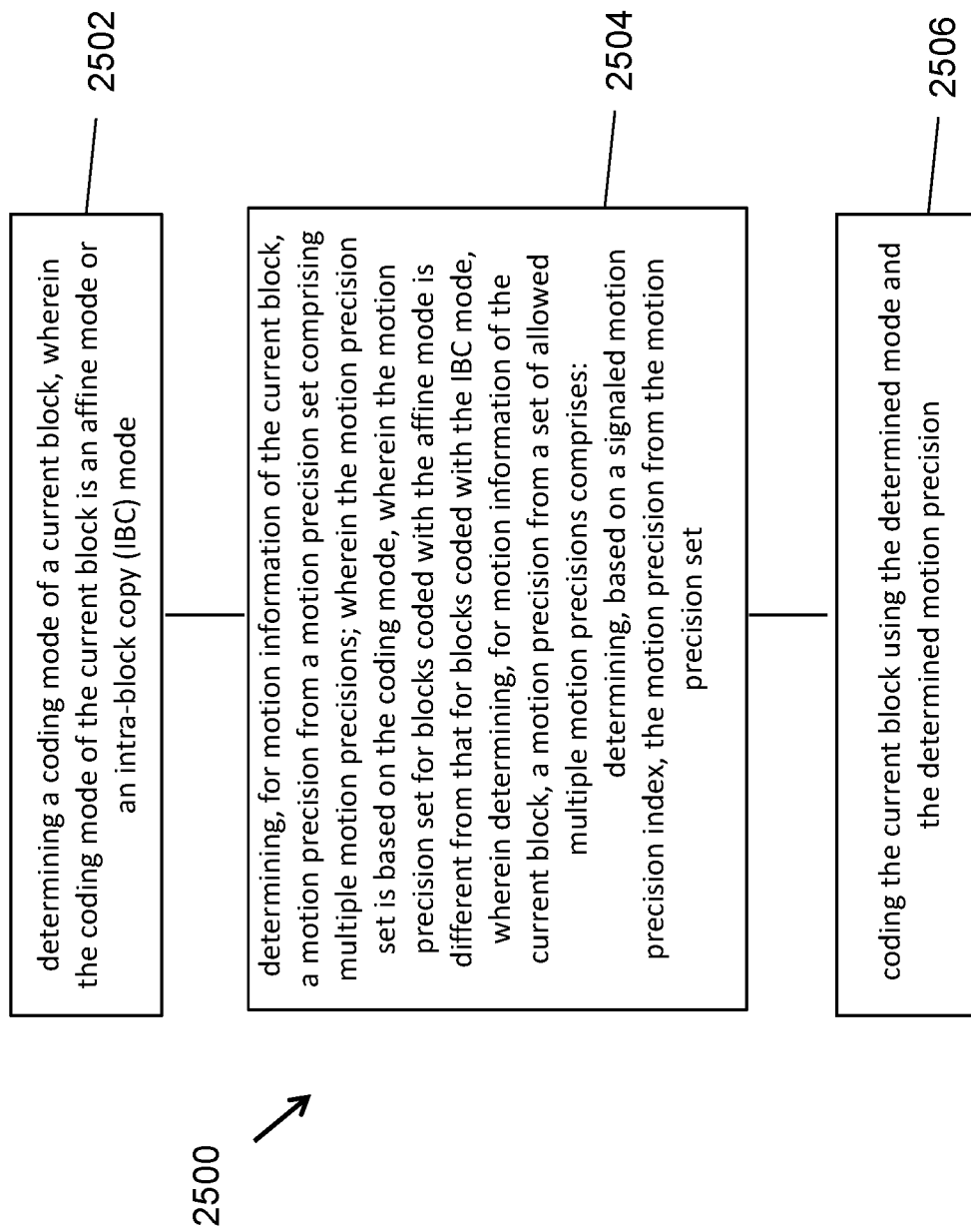
FIG. 25 is a flowchart for an example method of video coding.
Figure 26:
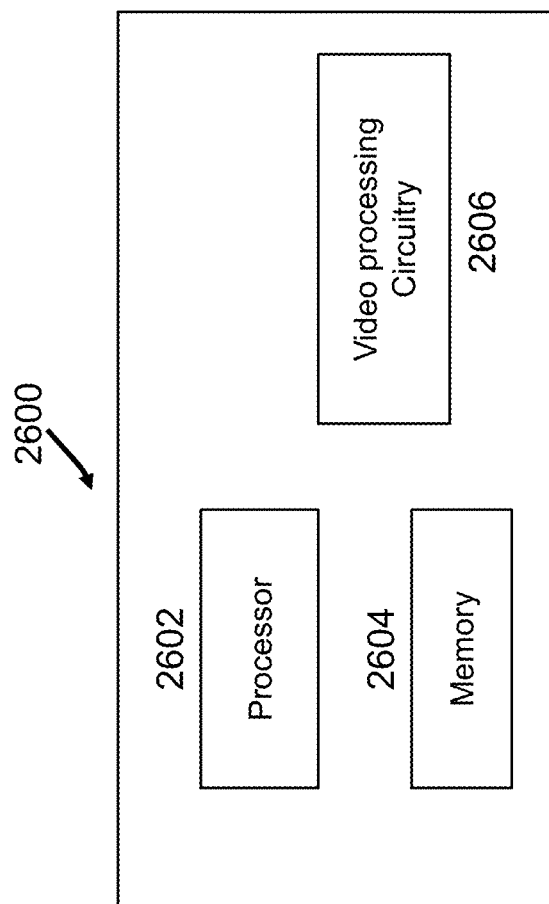
Figure 27:
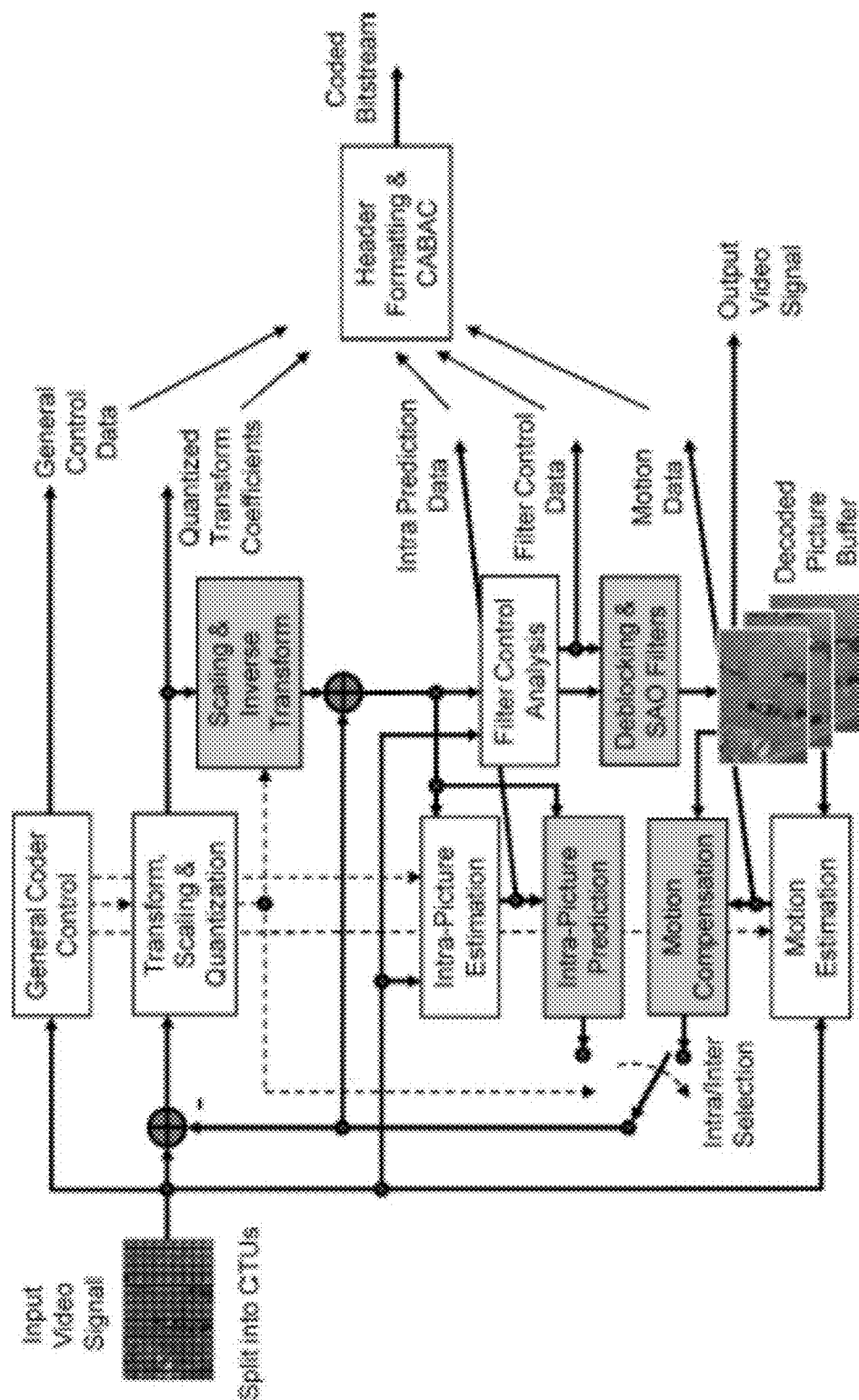

FIG. 25 is a flowchart for an example method 2500 of video bitstream processing. The video bitstream processing may be performed by a video decoder which uses the video bitstream to decompress the bits to create uncompressed video frames that may be stored or displayed for a user. The video bitstream processing of method 2500 may be performed by a video encoder that implements a decoder during the encoding process to reconstruct encoded video frames as would be done at a decoder.

The method 2500 includes determining (2502) a coding mode of a current block, wherein the coding mode of the current block is an affine mode or an intra-block copy (IBC) mode. The method 2500 includes determining (2504), for motion information of the current block, a motion precision from a motion precision set comprising multiple motion precisions; wherein the motion precision set is based on the coding mode, wherein the motion precision set for blocks coded with the affine mode is different from that for blocks coded with the IBC mode, and wherein determining, for motion information of the current block, a motion precision from a set of allowed multiple motion precisions comprises determining, based on a signaled motion precision index, the motion precision from the motion precision set. The method 2500 includes coding (2506) the current block using the determined mode and the determined motion precision.

In addition to the above described method, the method 2500 may further includes some of the following features.

Example 1

A method of video bitstream processing, comprising: determining, based on coding information of a current block, a motion precision set; and performing, based on the motion precision set, a conversion between a video block and a coded representation of the video block; wherein the conversion corresponds to a reconstruction of the current block.

Example 2

The method of Example 1, wherein the motion precision set corresponds to a precision set of motion vector difference (MVD).

Example 3

The method of Example 1, wherein motion precision set corresponds to a precision set of motion vector predictors (MVPs).

Example 4

The method of Example 1, wherein motion precision set corresponds to a precision set of motion vectors (MVs).

Example 5

The method of Example 1, wherein the coding information includes a quantization level of the current block.

Example 6

The method of Example 5, wherein a set of coarser MVD precision values is selected for a larger quantization level.

Example 7

The method of Example 5, wherein a set of finer MVD precision values is selected for a smaller quantization level.

Example 8

The method of Example 1, wherein the coding information includes a coding mode of the current block.

Example 9

The method of Example 8, wherein the coding mode comprises an affine mode.

Example 10

The method of Example 9, wherein the motion precision set for affine coded blocks are different from a non-affine mode coded block.

Example 11

The method of Example 8, wherein the coding mode comprises intra-block copy (IBC) mode.

Example 12

The method of Example 11, the motion precision set for IBC coded blocks are different from a non-IBC mode coded block.

Example 13

A method of video bitstream processing, comprising: determining, based on a selected motion precision set and a signaled motion vector difference (MVD) precision index, a MVD precision of a current block from a motion precision set; and performing, based on the MVD precision, a conversion between a video block and a coded representation of the video block using a MVD; and wherein the MVD represents a difference between a predicted motion vector and an actual motion vector used during motion compensation processing.

Example 14

A video decoding apparatus comprising a processor configured to implement a method recited in one or more of Examples 1 to 13.

Example 15

A video encoding apparatus comprising a processor configured to implement a method recited in one or more of Examples 1 to 13.

Example 16

A computer program product having computer code stored thereon, the code, when executed by a processor, causes the processor to implement a method recited in one or more of Examples 1 to 13.

From the foregoing, it will be appreciated that specific embodiments of the presently disclosed technology have been described herein for purposes of illustration, but that various modifications may be made without deviating from the scope of the invention. Accordingly, the presently disclosed technology is not limited except as by the appended claims.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method of video processing, comprising:
determining a coding mode of a current block, wherein the coding mode of the current block is an affine mode or an intra-block copy (IBC) mode;
determining, for motion information of the current block, a motion precision from a motion precision set comprising multiple motion precisions; wherein the motion precision set is based on the coding mode, wherein the motion precision set for blocks coded with the affine mode is different from that for blocks coded with the IBC mode, the motion precision set for blocks coded with the affine mode is different from that for blocks coded with a non-affine mode and the motion precision set for blocks coded with the IBC mode is different from that for blocks coded with a non-IBC mode; and
coding the current block using the determined mode and the determined motion precision,
wherein the motion precision set for blocks coded with the affine mode comprises only $\frac{1}{16}$-pel, $\frac{1}{4}$-pel and 1-pel, wherein $\frac{1}{16}$-pel is a precision of motion vectors stored for prediction of other blocks than the current block; and
wherein responsive to the coding mode of the current block being the affine mode, a coding tool is disabled, wherein the coding tool is used for bi-prediction with a motion vector from a previous reference picture and another motion vector from a future reference picture to refine the motion vectors.

2. The method of claim 1, wherein the motion information comprises at least one of a motion vector difference (MVD), a motion vector predictor (MVP), or a motion vector (MV).

3. The method of claim 1, wherein motion precision set corresponds at least one of a precision set of MVDs, a precision set of MVPs, or a precision set of MVs.

4. The method of claim 1, wherein determining, for motion information of the current block, a motion precision from a set of allowed multiple motion precisions comprises:
determining, based on a signaled motion precision index, the motion precision from the motion precision set.

5. The method of claim 1, wherein the motion precision set comprises at least one of 6-pel resolution, 4-pel resolution, 2-pel resolution, 1-pel resolution, $\frac{1}{2}$-pel resolution, $\frac{1}{4}$-pel resolution.

6. The method of claim 1, wherein the motion precision set comprises at least one of 4-pel resolution, 3-pel resolution, 2-pel resolution, 1-pel resolution, $\frac{1}{2}$-pel resolution, $\frac{1}{4}$-pel resolution.

7. The method of claim 1, wherein the coding comprises: decoding the current block from a video bitstream.

8. The method of claim 1, wherein the coding comprises: encoding the current block into a video bitstream.

9. An apparatus for video processing comprising a processor and a non-transitory memory with instructions thereon, wherein the instructions upon execution by the processor, cause the processor to:
determine a coding mode of a current block, wherein the coding mode of the current block is an affine mode or an intra-block copy (IBC) mode;
determine, for motion information of the current block, a motion precision from a motion precision set comprising multiple motion precisions; wherein the motion precision set is based on the coding mode, and wherein the motion precision set for blocks coded with the affine mode is different from that for blocks coded with the IBC mode, the motion precision set for blocks coded with the affine mode is different from that for blocks coded with a non-affine mode and the motion precision set for blocks coded with the IBC mode is different from that for blocks coded with a non-IBC mode; and
code the current block using the determined mode and the determined motion precision,
wherein the motion precision set for blocks coded with the affine mode comprises only $\frac{1}{16}$-pel, $\frac{1}{4}$-pel and 1-pel, wherein $\frac{1}{16}$-pel is a precision of motion vectors stored for prediction of other blocks than the current block; and
wherein responsive to the coding mode of the current block being the affine mode, a coding tool is disabled, wherein the coding tool is used for bi-prediction with a motion vector from a previous reference picture and another motion vector from a future reference picture to refine the motion vectors.

10. The apparatus of claim 9, wherein the motion information comprises at least one of a motion vector difference (MVD), a motion vector predictor (MVP), or a motion vector (MV).

11. The apparatus of claim 9, wherein motion precision set corresponds at least one of a precision set of MVDs, a precision set of MVPs, or a precision set of MVs.

12. The apparatus of claim 9, wherein the instructions upon execution by the processor, cause the processor further to:
determine, based on a signaled motion precision index, the motion precision from the motion precision set.

13. The apparatus of claim 9, wherein the motion precision set comprises at least one of 6-pel resolution, 4-pel resolution, 2-pel resolution, 1-pel resolution, $\frac{1}{2}$-pel resolution, $\frac{1}{4}$-pel resolution.

14. A non-transitory computer-readable storage medium storing instructions that cause a processor to:
determine a coding mode of a current block, wherein the coding mode of the current block is an affine mode or an intra-block copy (IBC) mode;
determine, for motion information of the current block, a motion precision from a motion precision set comprising multiple motion precisions; wherein the motion precision set is based on the coding mode, and wherein the motion precision set for blocks coded with the affine mode is different from that for blocks coded with the IBC mode, the motion precision set for blocks coded with the affine mode is different from that for blocks coded with a non-affine mode and the motion precision set for blocks coded with the IBC mode is different from that for blocks coded with a non-IBC mode; and
code the current block using the determined mode and the determined motion precision,
wherein the motion precision set for blocks coded with the affine mode comprises only $\frac{1}{16}$-pel, $\frac{1}{4}$-pel and 1-pel, wherein $\frac{1}{16}$-pel is a precision of motion vectors stored for prediction of other blocks than the current block; and
wherein responsive to the coding mode of the current block being the affine mode, a coding tool is disabled, wherein the coding tool is used for bi-prediction with a motion vector from a previous reference picture and another motion vector from a future reference picture to refine the motion vectors.

15. A non-transitory computer-readable recording medium storing a bitstream which is generated by a method performed by a video processing apparatus, wherein the method comprises:
- determining a coding mode of a current block, wherein the coding mode of the current block is an affine mode or an intra-block copy (IBC) mode;
- determining, for motion information of the current block, a motion precision from a motion precision set comprising multiple motion precisions; wherein the motion precision set is based on the coding mode, wherein the motion precision set for blocks coded with the affine mode is different from that for blocks coded with the IBC mode, the motion precision set for blocks coded with the affine mode is different from that for blocks coded with a non-affine mode and the motion precision set for blocks coded with the IBC mode is different from that for blocks coded with a non-IBC mode; and
- coding the current block using the determined mode and the determined motion precision,
- wherein the motion precision set for blocks coded with the affine mode comprises only 1/16-pel, 1/4-pel and 1-pel, wherein 1/16-pel is a precision of motion vectors stored for prediction of other blocks than the current block; and
- wherein responsive to the coding mode of the current block being the affine mode, a coding tool is disabled, wherein the coding tool is used for bi-prediction with a motion vector from a previous reference picture and another motion vector from a future reference picture to refine the motion vectors.

16. The non-transitory computer-readable storage medium of claim 15, wherein the motion information comprises at least one of a motion vector difference (MVD), a motion vector predictor (MVP), or a motion vector (MV).

17. The non-transitory computer-readable storage medium of claim 15, wherein motion precision set corresponds at least one of a precision set of MVDs, a precision set of MVPs, or a precision set of MVs.

18. The non-transitory computer-readable storage medium of claim 15, wherein the instructions upon execution by the processor, cause the processor further to:
- determine, based on a signaled motion precision index, the motion precision from the motion precision set.

19. The non-transitory computer-readable storage medium of claim 15, wherein the motion precision set comprises at least one of 6-pel resolution, 4-pel resolution, 2-pel resolution, 1-pel resolution, 1/2-pel resolution, 1/4-pel resolution.

20. The non-transitory computer-readable storage medium of claim 15, wherein the motion precision set comprises at least one of 4-pel resolution, 3-pel resolution, 2-pel resolution, 1-pel resolution, 1/2-pel resolution, 1/4-pel resolution.

* * * * *